United States Patent [19]
Crawford et al.

[11] Patent Number: 6,066,824
[45] Date of Patent: May 23, 2000

[54] RESISTANCE WELDING SYSTEM WITH A SELF-CONTAINED CLOSE-LOOP COOLING ARRANGEMENT

[75] Inventors: Michael D. Crawford, Rochester Hills; Joseph L. Miller, Rochester; Milton L. Turner, Fraser, all of Mich.

[73] Assignee: DCT Advanced Engineering, Inc., Detroit, Mich.

[21] Appl. No.: 09/062,950

[22] Filed: Apr. 20, 1998

[51] Int. Cl.$^7$ .............................. B23K 37/02; B23K 9/10
[52] U.S. Cl. ....................................... 219/86.31; 219/116
[58] Field of Search ................................ 219/86.31, 116, 219/89, 109; 336/61, 62

[56] References Cited

U.S. PATENT DOCUMENTS

| | | | |
|---|---|---|---|
| 4,233,488 | 11/1980 | Schwartz | 219/89 |
| 4,488,135 | 12/1984 | Schwartz | 336/62 |
| 5,262,609 | 11/1993 | Nowak et al. | 219/109 |

FOREIGN PATENT DOCUMENTS

WO 80/00229  2/1980  WIPO .

*Primary Examiner*—Patrick Ryan
*Assistant Examiner*—Anjan Dey
*Attorney, Agent, or Firm*—Rader, Fishman & Grauer PLLC

[57] ABSTRACT

A resistance welding system with a self-contained close-loop cooling arrangement which includes a chiller, a welding transformer, a cable and a welding gun. The chiller has a feed-port and return-port for the cooling fluid. The welding transformer has an inlet and outlet for a defined cooling path and the inlet is coupled with the feed port of the chiller while the outlet is coupled with the return port of the chiller. One end of the cable is connected to one side of the transformer, for carrying the welding current. The cable is capable of being coupled to the chiller in a manner to internally transfer the cooling fluid in either direction. The welding gun is connected to the other end of the cable and has a pair of electrodes for applying the current through a pair of workpieces. The welding gun also has a built-in cooling system which is capable of receiving, circulating and returning the cooling fluid to the chiller without external fittings and hoses.

4 Claims, 13 Drawing Sheets

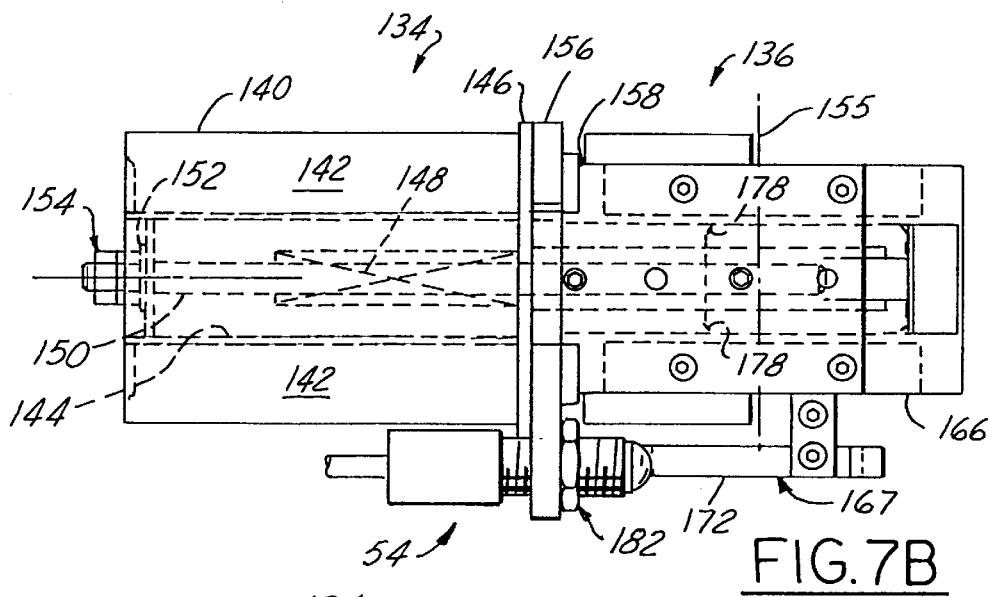
FIG.7B
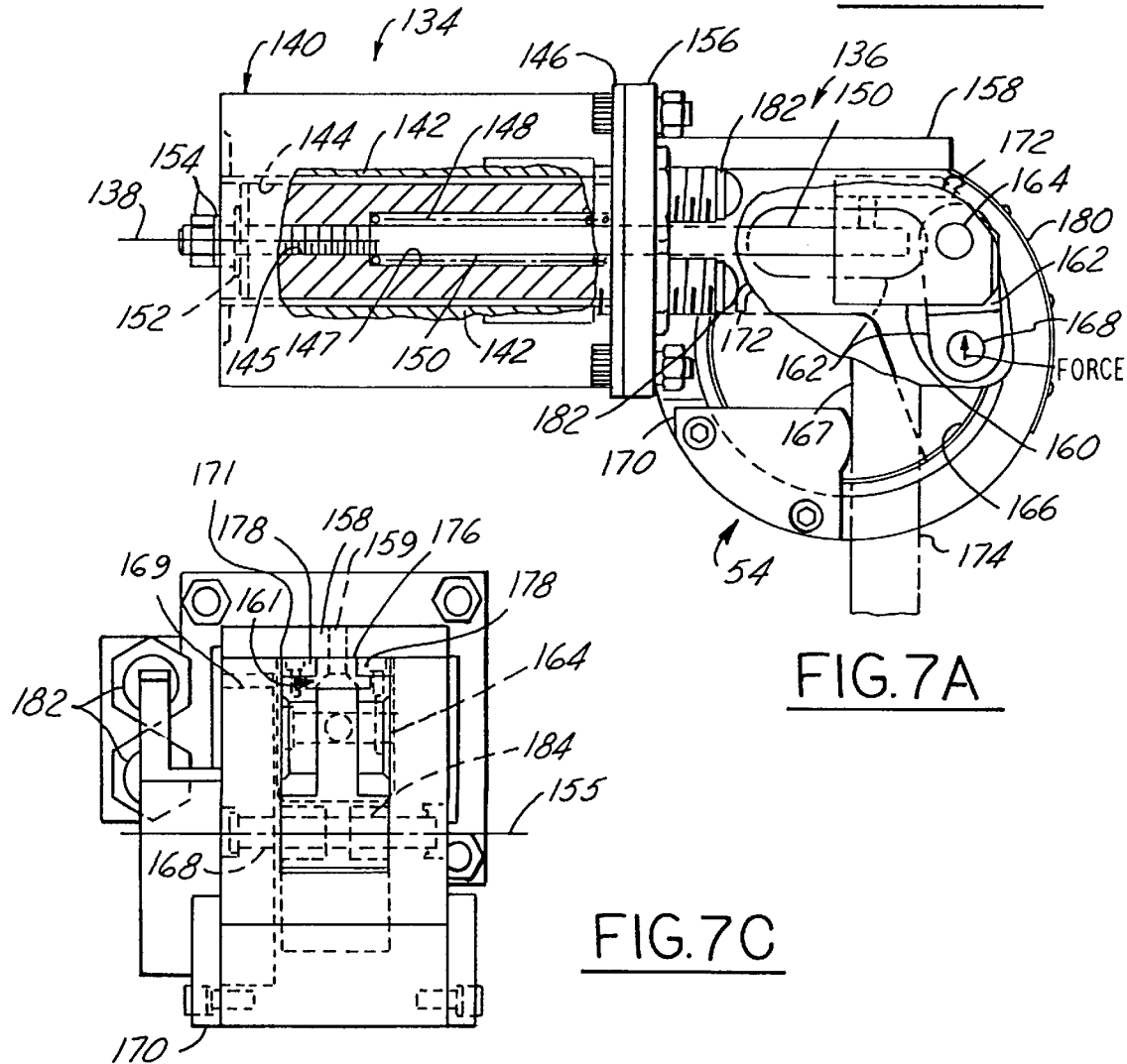
FIG.7A
FIG.7C

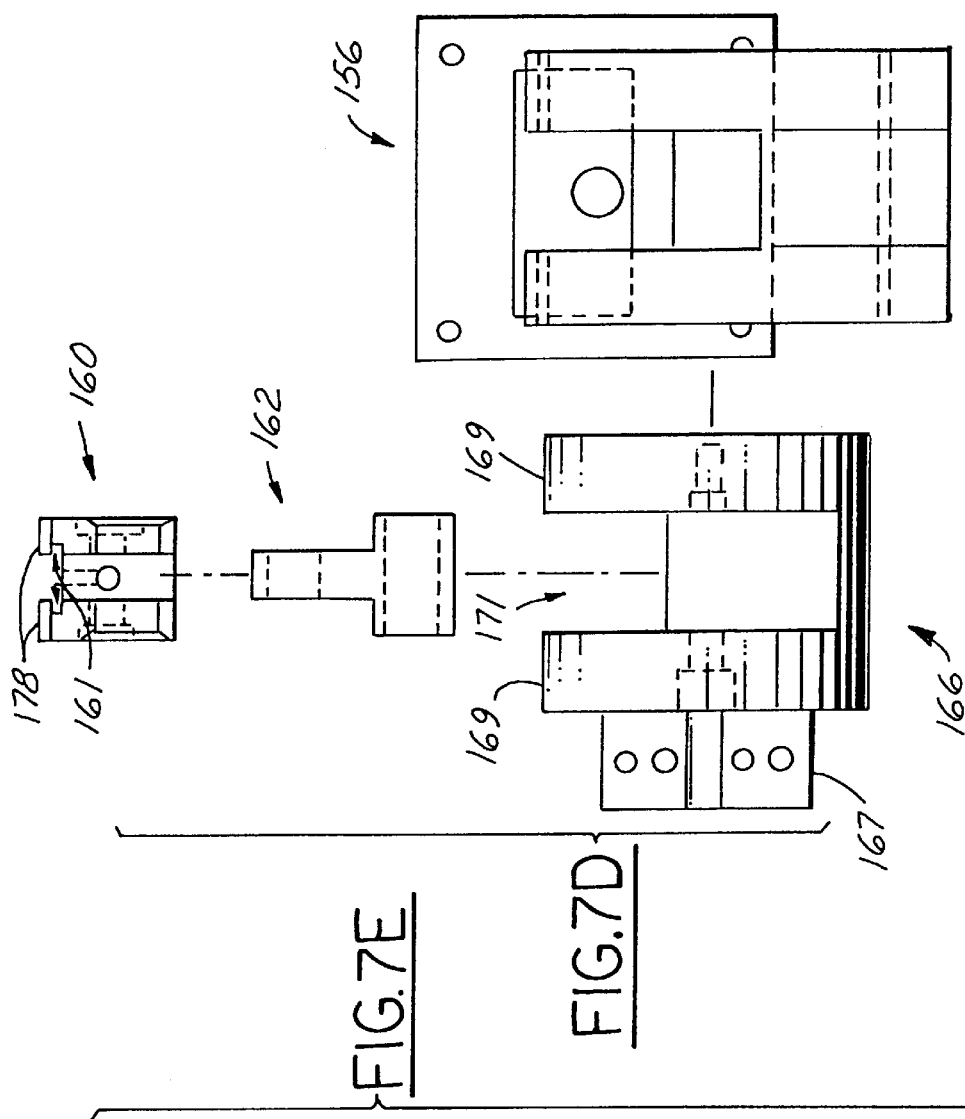
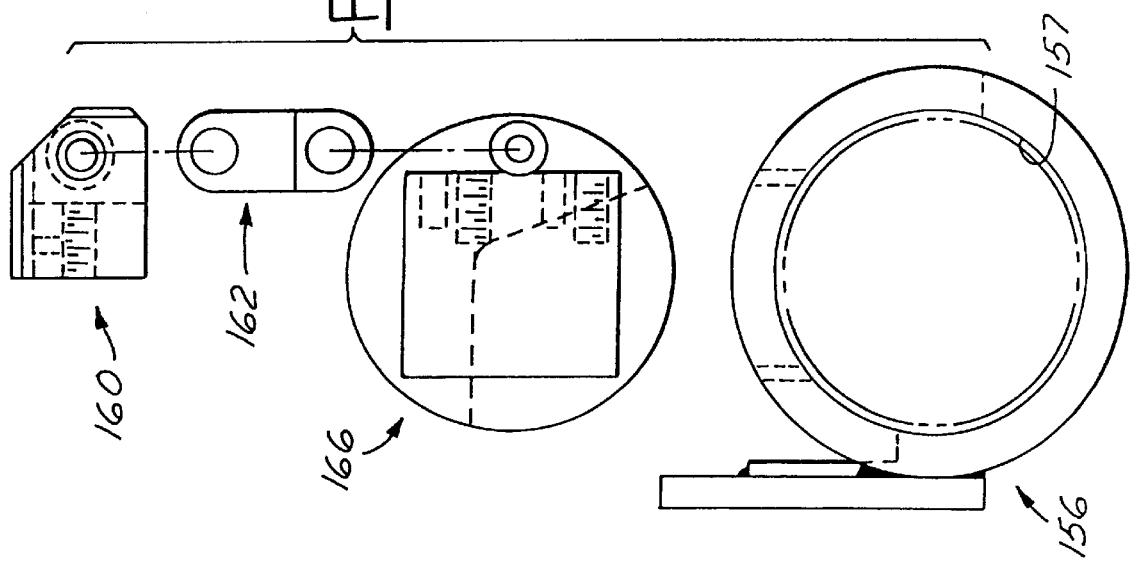

RESISTANCE WELDING SYSTEM WITH A SELF-CONTAINED CLOSE-LOOP COOLING ARRANGEMENT

BACKGROUND OF THE INVENTION

1. Field of the Invention

The present invention relates generally to an industrial workcell system and method, and, more particularly, to an all-electric industrial workcell using no plant-provided facilities suitably adapted for use in resistance welding operations.

2. Discussion of the Prior Art

An industrial or manufacturing workcell is generally provided in a plant or factory for performing various processing tasks on or to material or workpiece conveyed to the workcell. Exemplary industrial operations include welding (including resistance welding), piercing, mechanical fastening (e.g., riveting), forming operations, machining operations, material handling operations, assembly operations, hemming operations, adhesive application operations, and cutting operations (e.g., by way of laser systems). A key attribute associated with such a workcell is, of course, performance. However, since there are generally many different ways in which to implement any particular industrial operation, distinguishing key factors often also include cost (including start-up and maintenance), maintainability of the cell (e.g., availability/adaptability of replacement parts), and up time (alternately referred to as "down time"). Furthermore, industrial workcells generally include a variety of processing equipment from a variety of vendors, thus making inter-operability an issue. In particular, for large manufacturing concerns (e.g., an automotive manufacturer), the design and implementation of such industrial workcells are often delegated to "systems integrators," who take the manufacturers basic workcell specification, and then design, build, and test the workcells. The verified workcells are then torn-down, transported, and rebuilt at the large concerns' manufacturing site. In an increasingly competitive marketplace, investigation into improving industrial workcells to meet key attributes, such as performance, cost, maintainability, and down time, has been, generally, on a piece meal (i.e., individual component or subassembly) basis. Accordingly, the prior art has not seen significant and substantial improvements vis a vis the above-mentioned attributes.

To provide a more concrete idea of the direction taken and resulting shortcomings of the prior art, reference is now made to FIG. 1. FIG. 1 shows a prior art industrial workcell 10 adapted for industrial resistance welding operations. Workcell 10 includes a station panel view 12, a power and interface panel (PIP) 14, a robot controller 16, a robot 20 associated with robot controller 16, a welding transformer 22, a plant-provided compressed air manifold 24, a plant-provided cooling water feed manifold 26, a plant-provided cooling water return manifold 28, an air cylinder 30 mounted on a wrist of robot 20, a welding gun 32 coupled with air cylinder 30, and a welding current cable 34 coupling the welding gun 32 to a secondary side of transformer 22. Workcell 10 further includes a clamping tool 36, including a plurality of compressed air-actuated clamps 37 for securing the workpieces to be welded together in a predetermined fixed relationship with each other and relative to the fixed base.

FIG. 2 shows a generally enlarged view of the portion of FIG. 1 enclosed by dashed lines. In particular, note the large number of compressed air hoses 38, and cooling water feed and return hoses 39. It should be appreciated by those skilled in the art that the compressed air is provided for actuating air cylinder 30 to operate welding gun 32 (i.e., close and apply clamping force), and air clamps 37, while cooling water provided by manifolds 26 and 28 is provided for cooling power switching devices in weld control 18 (e.g., silicon controlled rectifiers—SCR), transformer 22, secondary (high current) cable 34, and welding gun 32, particularly the welding electrodes or tips included thereon.

There are a host of shortcomings associated with workcell 10. Foremost perhaps is the unreliability, or, in other words, the "down time" exhibited by such a configuration. It has been observed that over 80% of the down time of a workcell of the type shown in FIG. 2 can be attributed to the host of air hoses 38, and feed and return cooling water hoses 39. The necessity for such hoses, of course, derives from the use of conventional air cylinders/cooling designs, which rely exclusively on plant-provided facilities. The material costs of the various hoses, pipes, valves, etc. is tremendous. Furthermore, the labor costs for configuring robot 20 with the various hoses 38, 39, and the associated pipes, valves, etc. (i.e., "dressing" the robot), due to the employment of various skilled trades (such as pipefitters, plumbers, etc.), is likewise tremendous. Further, it should be particularly apparent that the "build" time is significantly increased, thus causing an increase in the delivery time of such a workcell to the commissioning manufacturer. Support hardware required for use of plant-provided cooling water, and compressed air, such as a surge tank and dense pack (i.e., required for control of the air cylinders), further escalate the material cost of workcell 10.

Another cost associated with workcell 10 relates to its uniqueness vis a vis other similarly-configured workcells in a plant environment. It should be appreciated that each workcell, necessarily, is a unique configuration, due to the fact that each length of hose, each bend in a pipe or conduit, and each selected placement for various cooling water fittings is necessarily tailored to the particular workcell. It should be further appreciated that the kinematics of the host of hoses (pejoratively referred to as "spaghetti") cannot be accurately predicted or modelled. Accordingly, the robot movements in each workcell must be inputted on-site, step-by-step, to ensure that hoses do not become entangled. To further exacerbate this problem, the resulting "windows" in which a robot arm may move through in order to reach, for example, a weld point, is significantly reduced, due, again, to the proliferation of the compressed air and water hoses 38, 39. In a manufacturing plant having a large number of workcells, the aggregate cost in having to individually configure each workcell is staggering.

It should be appreciated, however, that the shortcomings of prior art workcell 10 do not relate solely to cost, maintainability, and reliability, but rather, also extend to the performance of workcell 10. For example, reduced "window" openings restrict path choices for robot arm entry to the workpiece, thus increasing the time to process the workpiece. Further, the use of air cylinders, such as cylinder 30, restrict the jaw opening choices for weld gun 32. In particular, use of an air cylinder generally provides either open/close operation, or wide open/intermediate open/closed operation. Thus, as shown in FIG. 2, the conventional configuration may only provide for two jaw openings having opening widths of A and B. This inflexibility leads to increased processing time. For example, to clear an obstruction that is only slightly greater than distance A, when moving from one weld point to the next weld point, the jaw opening of gun 32 must be opened to its wide open position, tip separation distance B. It should be apparent that this inflexibility manifests itself in an increased processed time, as extra time is needed to both open the jaw to the wide open position, and then to close the jaw upon arrival at the next weld spot to its closed positioned. Moreover, performance as it relates to weld quality if also unsatisfactory in workcell 10. Particularly, a clamping force applied by gun 32 is an important factor in producing a quality weld on a statistically consistent basis. Due to limitations in the input compressed air pressure, the crude pressure regulation by the dense pack, and other factors (e.g., pressure drops in hose runs), clamping force cannot be controlled very accurately. The upshot of this inherent limitation regarding clamping force is that destructive-testing must be performed to verify welding operations from time-to-time (i.e., welded workpieces must be physically torn apart to determine, for example, break-away force, and weld nugget quality). Finally, each air clamp 37 requires an individual I/O port, thus increasing the interface size, and the associated wiring requirements. The compressed air-actuated air clamps 37 cannot be linked, as by some type of bus architecture (e.g., manufacturing automation protocol—MAP) since the associated control valves and the like are not amenable to such control.

Of course, many of these shortcomings are not limited to an industrial resistance welding operation; for example, a piercing operation relies on plant-provided hydraulics. Accordingly, such an industrial process also requires the above-described host of connecting hoses/valves and the problems associated therewith.

Accordingly, there is a need to provide an improved industrial workcell to process a workpiece or workpieces, such as a workcell adapted for a resistance welding operation, that minimizes or eliminates one or more of the problems as set forth above.

SUMMARY OF THE INVENTION

This invention generally provides an industrial workcell for processing a workpiece such that usage of preselected plant-provided facilities are eliminated. The general methodology derives from eliminating devices relying on plant-provided facilities for operation, such as compressed air, cooling water, and pressurized hydraulic fluid, and providing in substitution all-electric devices in the workcell to implement the desired industrial operation. A method of controlling an industrial workcell to process a workpiece in accordance with the present invention includes three basic steps. The first step involves fixing the workpiece in a predetermined location using electrically-actuated clamps wherein plant-provided compressed air is not used. The second step relates to selecting one of a plurality of industrial operations. The operations may include, welding, piercing, mechanical fastening, forming, and machining. The final step involves controlling an electrically-actuated electronically-controlled device to perform the selected industrial process on the workpiece fixed in the predetermined location wherein plant-provided facilities, such as compressed air, cooling water, or pressurized hydraulic fluid, are not used.

Preferably, the method of controlling an industrial workcell relates to a resistance welding operation. The step of fixing the workpiece in a predetermined location using electrically-actuated clamps includes the substeps of positioning a second workpiece in a predetermined relationship with the first workpiece, and then, fixing the first and second workpieces in the predetermined location using the electrically-actuated clamps. The electrically-actuated device is an electrically-actuated actuator assembly mounted on a wrist of a robot and is coupled to a welding gun assembly. The welding operation includes the step of controlling the actuator assembly to position the welding gun for welding at a selected position and further controlling the actuator assembly to apply a predetermined clamping force. The workcell also preferably includes self-contained closed-loop cooling means for cooling the high current components, such as the welding gun, a welding transformer and the secondary current cable(s) therebetween. The operation of the workcell is controlled such that no plant-provided facilities (i.e., here, no compressed air nor cooling water) are used. By providing an all-electric workcell, the need for plant-provided facilities are eliminated, thus eliminating the associated water and air hoses and associated support hardware. The material cost of a workcell for resistance welding in accordance with the present invention is reduced by 30–35%, as compared with conventional technology. Moreover, labor costs in installing the workcells are also significantly reduced. Significant improvements in reliability, attributed mainly to elimination of many of the water and air hoses, has been realized for the preferred embodiment. Further, delivery time, in absolute terms, has also been significantly reduced.

In another aspect of the present invention, an apparatus for securing a workpiece using a control signal is provided. An apparatus in accordance with this aspect of the invention defines a tool, which includes a base portion adapted to receive the workpiece, and plurality of electrically-actuated clamps connected to the base and responsive to the control signal for fixing the position of the workpiece relative to the base. Actuation of the clamps is controlled electrically by wire, rather than by way of compressed air using control valves, air hoses, air cylinders and the like. Although each clamp may be allocated its own I/O port in an industrial control system (e.g., a PLC I/O port), it is preferably contemplated that the clamps be electrically coupled serially through a data highway wherein each clamp has associated therewith detection means responsive to the control signal for detecting a respective address and for actuating, in response thereto, the addressed electrically-actuated clamp to fix the position of the workpiece.

In a third aspect, a method related to the apparatus for securing a workpiece is provided. The method includes five basic steps. The first step involves assigning an address to each clamp. Next, selecting one of the clamps for actuation. The third step involves formatting the control signal to include the address associated with the clamp desired to be actuated. Next, broadcasting the control signal to each clamp through the data highway. Finally, the fifth step involves providing actuation power to the clamp selected in the second step upon receipt of the control signal containing its address.

In a fourth aspect of this invention, a novel clamp is provided that contains four major components: a housing, a shaft, a clevis, and a link member. The shaft is rotatably disposed in the housing. The clevis is slidably mounted to the housing for motion along a longitudinal axis. The link couples the linear motion of the clevis to the angular motion of the shaft; accordingly it is rotatably connected to both clevis and shaft. Movement of the clevis thus effects rotation of the shaft.

In a fifth aspect of this invention, an improved weld gun assembly for use in a resistance welding system having electrical actuation is provided. The improved weld gun assembly includes four major components, a welding gun, a force detection means, an electrically-actuated electronically-controlled actuator means, and a control means. The welding gun has a pair of electrodes continuously separable through a predetermined range for providing welding current through a pair of workpieces to form a weld. The force detection means is preferably a load cell and is operatively coupled to the welding gun for detecting a force being applied between the electrodes and for generating a signal indicative of the detected force. The actuator means is operatively and mechanically coupled to the weld gun for moving the electrodes to any one of a plurality of electrode separation distances in a continuous fashion within the predetermined range. Finally, the control means is coupled to the actuator means and is provided for controlling the actuator in accordance with predetermined criteria including a selected one of said electrode separation distances. Particularly using the force indicative signal for controlling the actuator to move the electrodes such that a predetermined clamping force is applied therebetween.

In a sixth aspect of this invention, an improved resistance welding system having self-contained, closed-loop cooling is provided. The system includes four major elements: a chiller, a welding transformer, a cable, and a welding gun. The chiller is associated exclusively with the welding system (not a plant-provided facility) and is provided for removing heat from cooling fluid. The chiller has a feed port and a return port for the cooling fluid. The welding transformer includes a first inlet and outlet The first inlet is coupled to the feed port, and the first outlet is coupled to the return port of the chiller. The cable is coupled to the transformer and is provided for carrying secondary welding current to the welding gun and may take a variety of forms depending upon the particular configuration of the workcell (e.g., a "hip" mount configuration, a transgun configuration, or a remote mounted transformer for a "hard" (fixed) tool weld configuration). Common to each of these configurations, however, is that the cable includes means for transferring cooling fluid without external cooling fluid fittings and hoses. In a "hip" mounted transformer configuration, the cable is a kickless cable having two flow paths: a feed path, and a return path. The welding gun, in a like manner, has a variety of configurations depending the workcell configuration; however, the unifying attribute of each welding gun is that each includes means for receiving cooling fluid without external cooling fluid fittings and hoses. In a welding system having a "hip" mount configuration, the welding gun includes at least one internal cooling channel having an inlet and an outlet coupled to the cable for cooling its electrodes. The feed path of the cable being connected to the gun inlet (by way of a jumper cable), and the return path of the cable being coupled to the gun cooling fluid outlet (by way of a jumper).

These and other features and object of this invention will become apparent to one skilled in the art from the following detailed description and the accompanying drawings illustrating features of this invention by way of example.

BRIEF DESCRIPTION OF THE DRAWINGS

FIG. 7A is a broken-away and partially sectioned side view of an electronically-controlled electrically-actuated clamp in accordance with the present invention.

FIG. 7B is a simplified top view of the clamp of FIG. 7A.

FIG. 7C is a simplified front view of the clamp of FIG. 7A.

FIG. 7D is a partial exploded view, showing side view of the clevis, link, shaft, and housing portions of the clamp depicted in FIG. 7A.

FIG. 7E is a partial exploded view, showing front views of the clevis, link, shaft, and housing portions of the clamp depicted in FIG. 7A.

DETAILED DESCRIPTION OF THE PREFERRED EMBODIMENT

Figure 3:
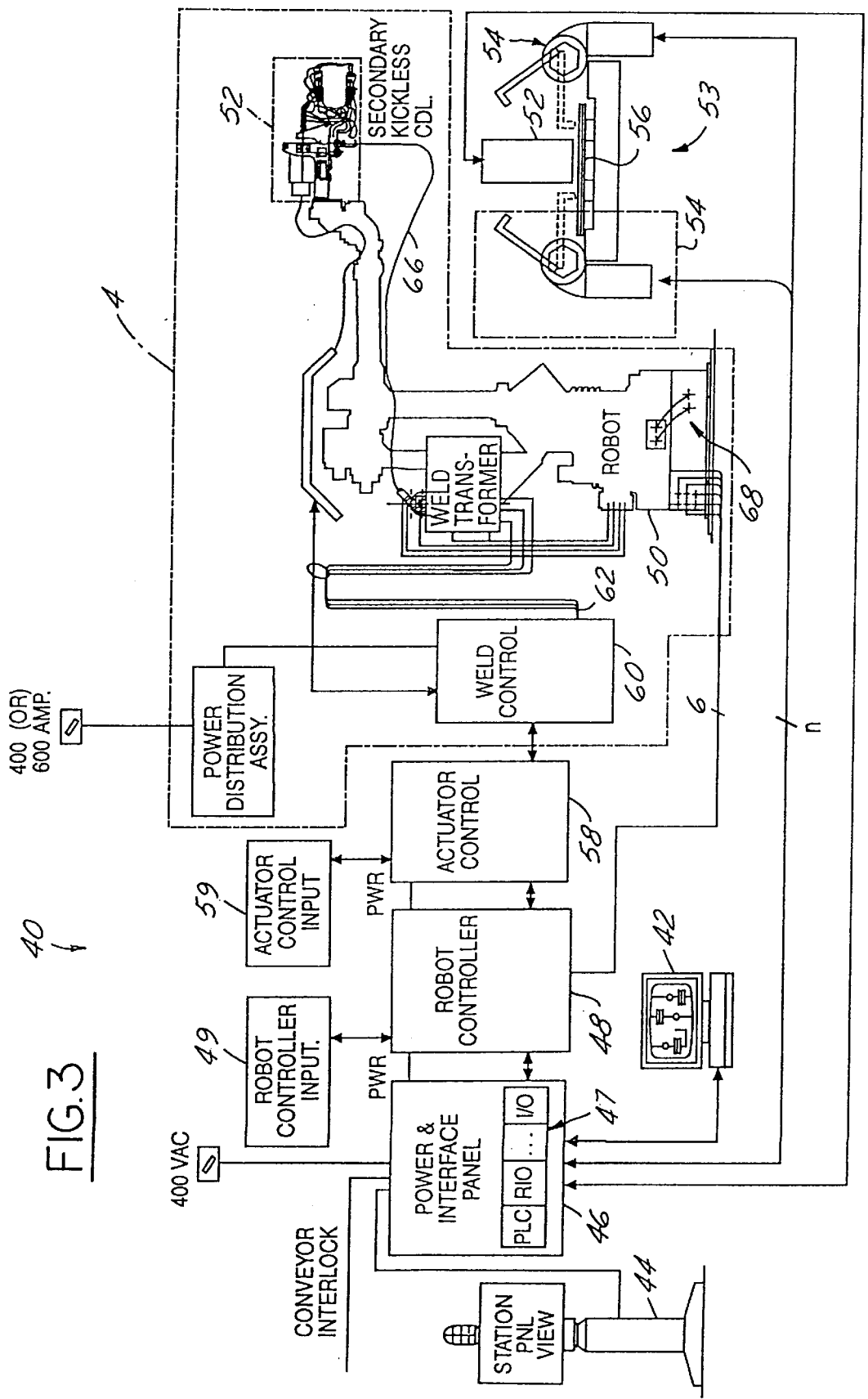
FIG. 3 is a simplified diagrammatic and block diagram view of a preferred resistance welding workcell embodiment of the present invention.

Referring now to the drawings wherein like reference numerals are used to identify identical components in the various views, FIG. 3 shows an industrial workcell 40 for performing one of a plurality of industrial operations on or to a workpiece such that usage of preselected plant-provided facilities is eliminated. Preferably, workcell 40 is adapted to perform a resistance welding operation, although it should be appreciated that other industrial operations may be selected and remain within the spirit and scope of the present invention. Workcell 40 includes an industrial general purpose programmable digital computer 42, a station panel view 44, a power and interface panel (PIP) 46, a control and input/output rack 47, a robot controller 48 having an associated robot controller input 49, an industrial manipulator or robot 50, an electronically-controlled electrically-actuated device 52 for performing a selected industrial operation, means 53 for securing a workpiece using a control signal including an electronically-controlled electrically-actuated clamp 54, workpiece 56, actuator control 58 having an associated actuator control input 59, a weld control 60, a primary current connection 62 coupled to weld control 60, a weld transformer 64, a secondary cable 66, and means 68 for chilling welding cooling fluid.

Computer 42 is included in workcell 40 for providing an interface to control and I/O rack 47. In a constructed embodiment of the present invention, workcell 40 is controlled by a programmable logic controller (PLC) program using ladder logic. It is preferably contemplated, however, that workcell 40 be controlled using one of the many PLC replacement systems commercially available. Generally, a central processing unit (CPU) card associated with a PLC system is programmed using ladder logic type software to control the system by way of, for example, an I/O card in rack 47. The PLC replacement system replaces the CPU card with a remote interface card. The general purpose computer 42 houses a bus controller card in one of its slots. Software is then executed on the computer 42, which, by way of the bus controller card in computer 42, and the remote interface in the rack 47, controls various components of workcell 40 in a manner similar to that of the PLC type CPU card. However, the software used to program the control of the workcell in the PLC replacement systems, (generally a flow-charting software language) is much easier to implement and debug than ladder logic. Moreover, in general, these PLC replacement systems have far greater diagnostic capabilities than those found in conventional PLC systems.

Particularly, general purpose computer 42 may be an AST model P-90 computer, a Pentium processor based system including 16 megabytes of random access memory (RAM), a 400 megabyte hard drive, and including a Mitsubishi Diamond 21T monitor.

The PLC replacement software preferably contemplated for inclusion in workcell 40 is a package called the Visual Logic Controller™, version 1.21, by Steeplechase Software, Inc., of Ann Arbor, Mich. 48106. The Visual Logic Controller™ is a Windows™-based software package, and, as described above, replaces three separate devices: the PLC central processing unit (CPU), the PLC programming terminal, and an operator interface panel. The Visual Logic Controller™ includes flow-chart programming, an easy access tool box of development tools, support for multiple Windows™, and project management tools. The card housed in a slot of computer 42 that cooperates with the Visual Logic Controller™ may be a G.E. Genius bus controller-type card while the remote interface card in the rack 47 may be a G.E. remote I/O scanner card, assuming a G.E. Fanuc rack system is used. It should be understood, however, that the Visual Logic Controller™ may be used in conjunction with other I/O modules in rack 47 from other sources (e.g., Allen-Bradley, APC Seriplex, etc.).

Station panel view 44 is included in workcell 44 for providing an indication of the status of selected operations/logic states. Panel view 44 is conventional.

PIP 46 provides a main interconnect point for many of the devices and controls included in workcell 40. In particular, for example, robot controller 48, and actuator control 58 derive operating power from PIP 46. Furthermore, robot controller 48, actuator control 58, and weld control 60 may communicate, with each other by way of interconnects in PIP 46.

Control and I/O rack 47 is preferably of the type employing a G.E. Fanuc Series 90-70 backplane format. It should be appreciated, however, that other systems, such as Allen-Bradley, and APC Seriplex, to name a few, are completely equivalent for purposes of this invention. As mentioned above, workcell 40, as an interim measure, is controlled by a PLC based CPU card located in rack 47. However, it is preferably contemplated that a PLC replacement system, particularly Steeplechase Software's Visual Logic Controller™, be used in lieu of the PLC type CPU control. Other cards which may be included in rack 47 include a Genius bus controller card, a remote I/O scanner (RIO) card, and a plurality of input/output (I/O) cards. In particular, the bus controller card may be provided in a head-end rack and provide a serial interface to remote I/O racks containing an RIO card. That is, there may be several racks in workcell 40. The head-end rack includes the CPU (or PLC replacement equivalent) card, and the bus controller card. The far-end or remote I/O racks each include an RIO card. A link is made from the head-end rack to a first one of the remote I/O racks (from bus controller to RIO card). The RIO card in the remote rack is then daisy-chained to an RIO card in a second I/O remote rack, and so on. In this way, multiple racks of I/O cards may be provided in the system to accommodate particular I/O size requirements.

Figure 4:
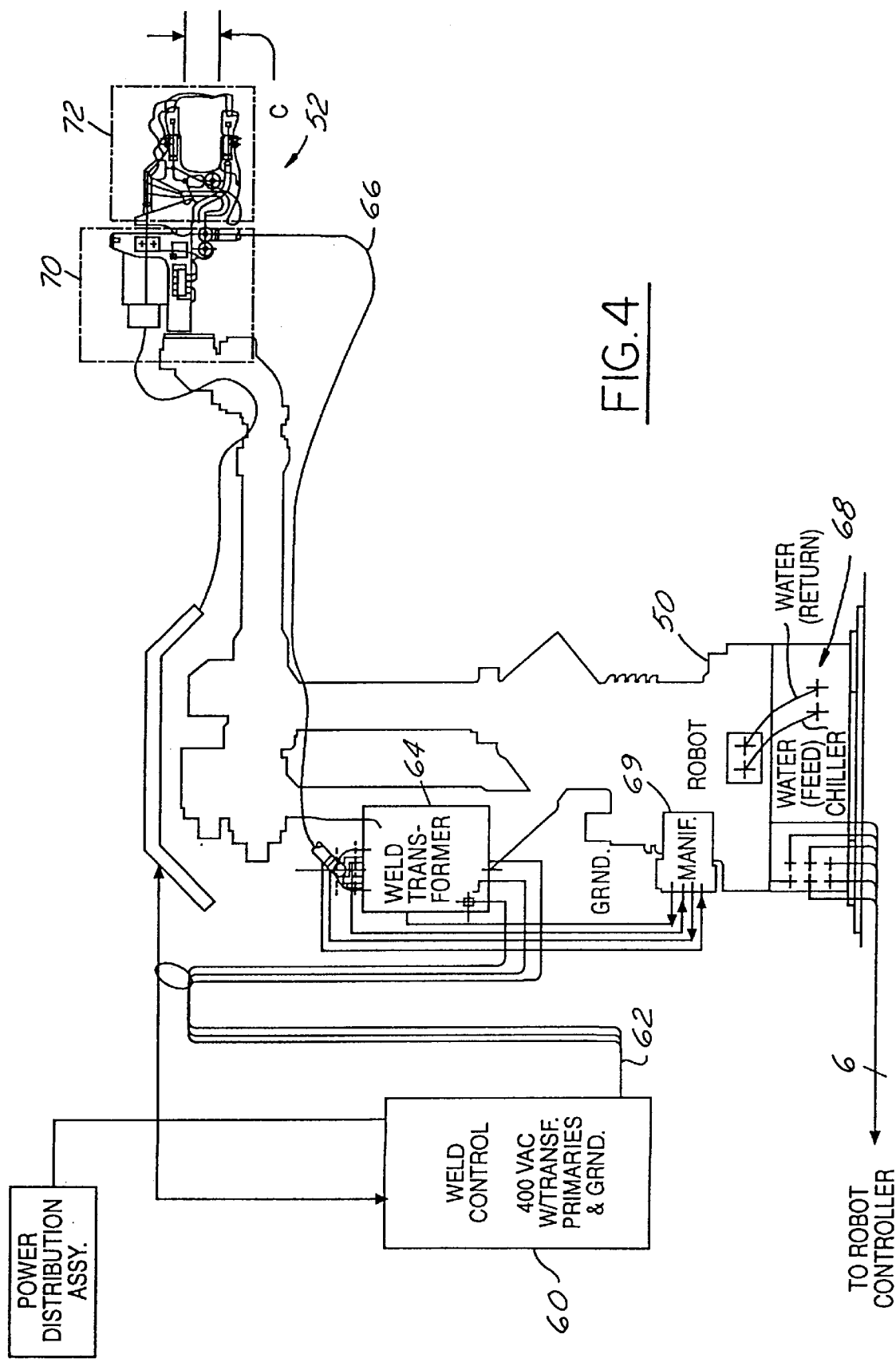
FIG. 4 is an enlarged view of the portion of FIG. 3 enclosed by a phantom line, showing particularly a robot unencumbered by a proliferation of compressed air, and feed and return cooling water manifolds and hoses.

Robot controller 48, robot controller input 49, and robot 50 are provided for moving electrically-actuated device 52 relative to workpiece 56 to, for example, make spot welds in a plurality of locations across the workpiece 56. In the illustrative embodiment, robot 50 may be a robot model SA 130 by Nachi Robotic Systems Inc., Novi, Mich. 48375. Relevant operating characteristics of SA 130 include a 130 KGF wrist loading weight, 50 KGF forearm loading arm, 6 degrees of freedom, and repeatability to ±0.3 mm. Nachi SA 130 robot 50 is matched by a Nachi AR controller 48 having an associated input pad 49 for programming movements and other functions conventionally programmed into a robot. FIG. 4 shows an enlarged portion of FIG. 3 enclosed by phantom line. As shown clearly in FIG. 4, robot 50 includes a manifold portion 69 for routing cooling fluid from chiller 68 to weld transformer 64, and electrically-actuated means 52. Robot controller 48 may be programmed to perform a welding cycle. A welding cycle being defined by a predetermined number of welds, a position associated with each weld, a weld schedule (to be performed by control 60), and a actuator schedule, which will be explained in more detail below.

Figure 1:
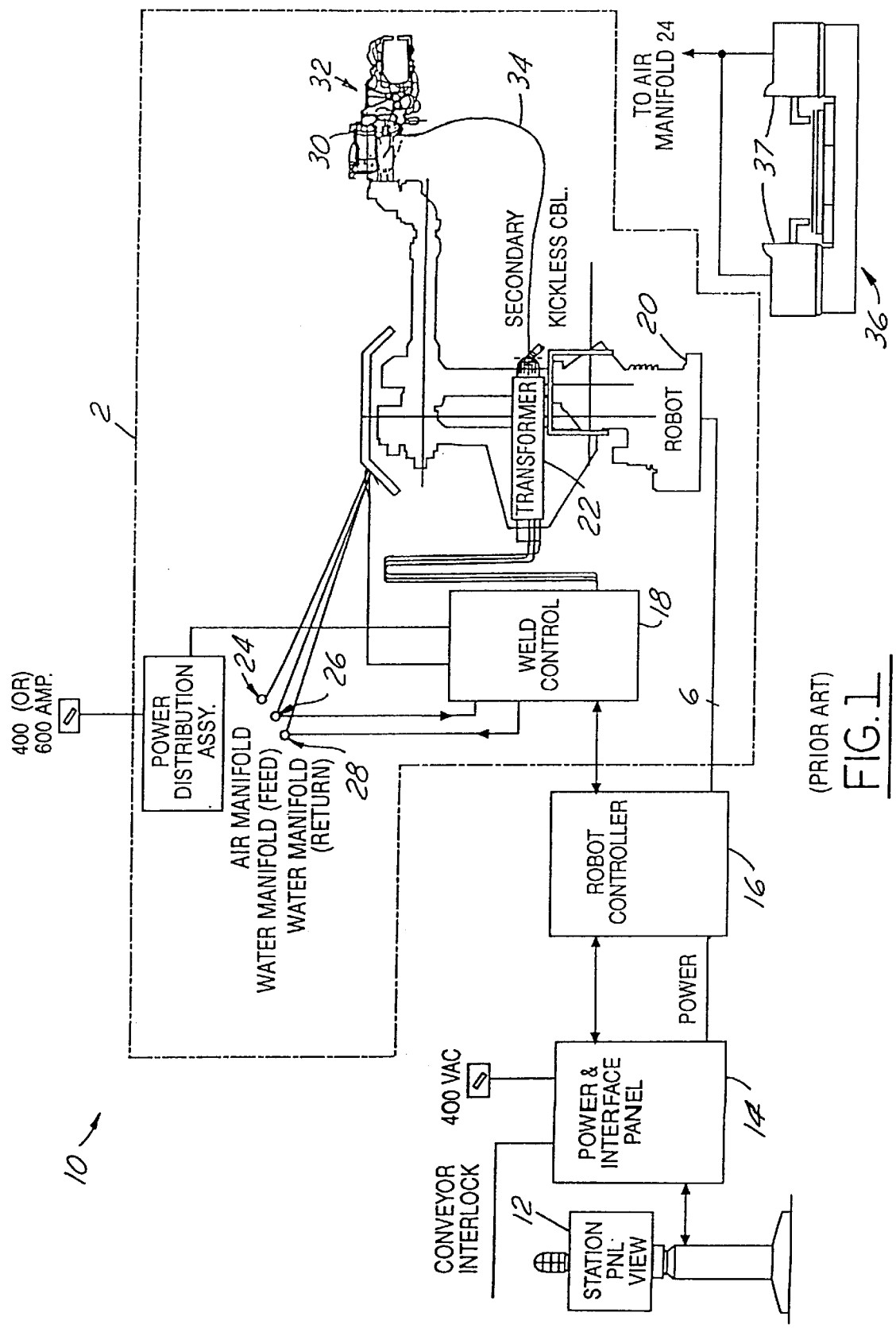
FIG. 1 is a simplified diagrammatic and block diagram view of a prior art industrial workcell adapted for use in resistance welding operations.
Figure 2:
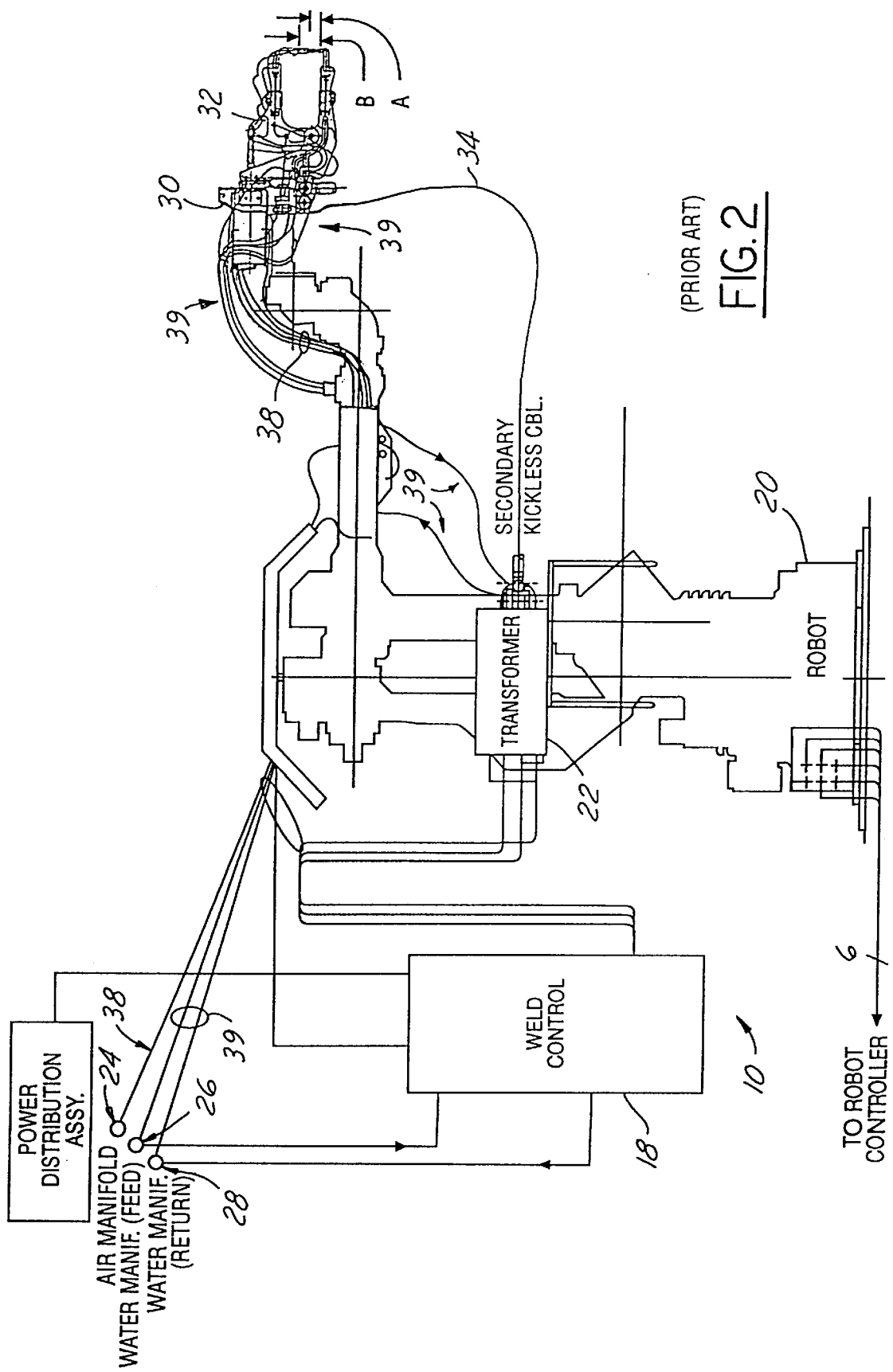
FIG. 2 is an enlarged view of the portion of FIG. 1 enclosed by a dashed line, showing particularly a robot encumbered by a proliferation of compressed air, and feed and return cooling water hoses as dictated by reliance on plant-provided facilities.

Electrically-actuated electronically-controlled means 52 is provided generally for performing any one of a plurality of selected industrial processes. With continued reference to FIG. 4, electrically-actuated means includes an electrically-actuated electronically-controlled actuator device 70, and an industrial tool 72, which is preferably a welding gun 72. Device 70 provides improved functionality that improves performance of workcell 40, particularly, the ability to accurately and repeatably applying a predetermined force, and further, to provide the means, operatively coupled to weld gun 72, for moving electrodes of the gun to any one of a plurality of electrode separation distances within a predetermined range. Particularly, as shown in FIG. 4, assume that the distance designated by C is the predetermined range of gun 72. Actuator assembly 70 provides the means for moving the electrodes of gun 72 to any one of a plurality of electrode separation distances within range C. In other words, actuator assembly 70 provides the means for substantially continuous variation of the separation distance of the electrodes. This provides substantially improved flexibility, as compared to the prior art air cylinder 30/welding gun 32 as shown in FIG. 1, which only permits full-closed/full-open operation, or at best, full-closed intermediate open/full open operation (i.e., discrete separation distances, as opposed to continuously-variable separation distances). The advantages arising from this continuously-variable separation distance features is the ability to tailor welding gun 72 jaw opening to the workpiece being welded to avoid obstructions so as to minimize unnecessary jaw movement, which only serves to increase the time required in the welding process.

Figure 5:
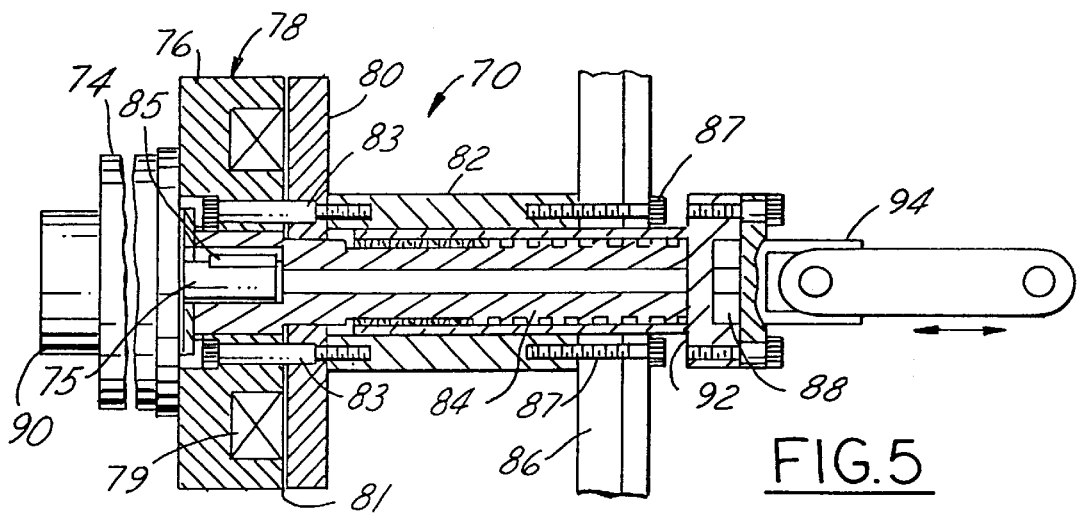
FIG. 5 is a simplified cross-sectional view of the electronically-controlled electrically-actuated device for performing a selected industrial operation shown in FIG. 4.

Referring now to FIG. 5, a cross-sectional view of the actuator device 70 is shown. Preferably, actuator device 70 is a model M200 AX, SN106, by Aura Systems, Inc. El Segundo, Calif. Functional specifications of actuator device 70 include programmable clamping force of up to 1500 pounds, full stroke length of three inches, idle-to-weld position (1 inch)—maximum time travel no greater than 250 miliseconds, communication compatibility with existing, conventional central controllers, and a size comparable to existing pneumatic (air) actuators. Actuator 70 includes DC motor 74 having shaft 75, electrode magnetic clamp 76 including stator 78, coil 79, rotor 80, and gap 81, cover 82, shoulder bolts 83, Acme screw 84, key 85, frame 86, shoulder bolts 87, load cell 88, encoder 90, sleeve member 92, and bracket 94.

DC motor 74 performs it conventional function of rotating shaft 75 when controlled to do so. A mounting flange integral with DC motor 74 is used for fixedly mounting DC motor 74 to stator 78 of clamp 76 using conventional fasteners (not shown). Stator 78 and rotor 80 are connected by shoulder bolts 83. It should be appreciated that a head portion of shoulder bolt 83 abuts stator 78; accordingly, gap 81 cannot be increased by moving stator 78 and rotor 80 apart.

Frame 86 is fixed to the structure of robot 50. Cover 82 is fastened in fixed relation to frame 86 by way of shoulder bolts 87. Accordingly, cover 82 is also fixed. Rotor 80 is also fixed to cover 82 by way of a threaded portion of bolt 83. Therefore, rotor 80, cover 82, and frame 86 are fixed. However, stator 78 may move toward rotor 80, since a counterbore is formed in stator 78 for the head portion of bolt 83 just for that purpose. Of course, motor 74 will move with stator 76, since they are fixedly mounted.

Screw 84 is coupled to shaft 75 by way of key 85. Therefore, when shaft 75 rotates, screw 84 rotates therewith. Sleeve member 92 includes internal threads adapted to mesh with and mate with the threads of screw 84. Furthermore, sleeve 92 is slidably disposed within cover 82, such that rotation of screw 84 will cause sleeve member 92 to move inwardly and outwardly relative to frame 86. Bracket 94 is fastened to sleeve 92 by way of conventional fasteners.

Load cell 88 is positioned intermediate sleeve 92, and bracket 94 so as to be able to deform under load, and accordingly detect an applied force. Preferably, load cell 88 is an Omega (LCG) series compression load cell, thermally compensated within a temperature range of 60° F. to 160° F., requiring a 10V excitation voltage, and selected to detect the range of forces likely to be applied by welding gun 72 (in the preferred embodiment, at least 1500 pounds).

Bracket 94 is attached to welding gun 72. Thus, as bracket 94 is moved left-to-right-to-left with respect to frame 86, the jaws of the welding gun 72 open, close, and open accordingly.

During normal operation of actuator device 70, DC motor 74 is controlled to rotate shaft 75, which in turn causes Acme screw 84 to rotate since shaft 75 and screw 84 are connected by way of key 85. Rotation of screw 84 causes sleeve member 92 to move in and out with respect to frame 86, thus also moving bracket 94 to open and close the jaws of welding 72 in a substantially continuous fashion to any predetermined separation distance within the predetermined range, as illustrated by distance C in FIG. 4.

Preferably, in actual operation, device 70 is controlled to close the jaws of welding gun 72 until a "stall" condition occurs (i.e., the tips or electrodes of gun 72 just contact the workpiece, or, perhaps, a small force of, perhaps 100–200 pounds of force is detected by load cell 88).

At this point, the electromagnetic clamp portion 76 is preferably controlled move sleeve member 92 outwardly relative to frame 86 in order to achieve a predetermined clamping force, as detected by load cell 88. This effect is achieved by passing current through 79, causing stator 78, and motor 74 to move in the direction of rotor 80. Of course, shaft 75 also moves with motor 74, which causes screw 84 to also move, which in turn causes sleeve members 92, and finally bracket 94 to also move outwardly to thereby apply the clamping force. The magnitude of the clamping force can be controlled by control circuitry using load cell output as feedback to control the magnitude of the energizing current through coil 79. This programmable force feature of actuator device 70 permits accurate control of the resistance welding event for a variety of welding situations, unlike the prior art combination of compressed-air manifold/dense pack/air cylinder 30, which is ineffective in controlling and maintaining a desired pressure with any degree of accuracy.

Figure 6G:
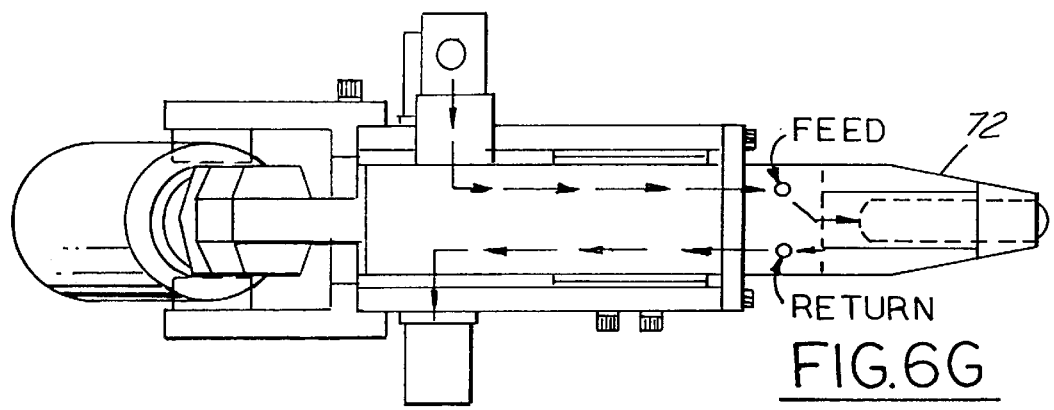
FIG. 6G is a top view of the welding gun of FIG. 6A.
Figure 6A:
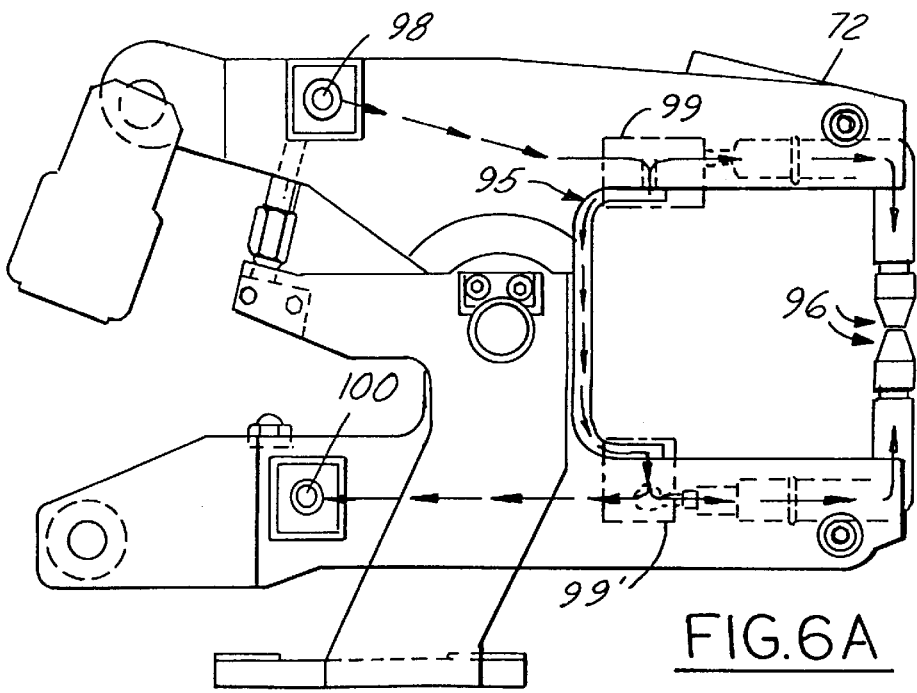
FIG. 6A is a simplified side view of an exemplary welding gun illustrating basic mechanical operation and feed and return cooling fluid ports.

Referring now to FIG. 6A, a side view of welding gun 72 is depicted. Before proceeding with a description of welding gun 72, it should be reiterated that welding gun 72 may be replaced by one of a plurality of other tools in order to carryout the selected one of the plurality of processes, including piercing (which usually uses plant-provided hydraulics) by way of a piercing tool, mechanical fastening, for example, riveting using a riveting tool, forming, by way of forming dies, machining, and hemming by way of a hemming tool.

Welding gun 72 includes ribbon hose 95, electrodes 96, O-rings 97, cooling fluid inlet (feed) 98, flow split region 99 and 99 cooling fluid outlet (return) 100. The welding gun 72 illustrated in FIG. 6 is of a conventional type available from Milco Manufacturing, Warren, Mich., identified by Tool No. 41-858-2010, and gun ID P-PL-3272-1 (made for Chrysler Corp.). This conventional weld gun is modified slightly to include crossover cooling path jumpers as shown by the arrows. Referring to FIG. 6A, cooling fluid enters feed port 98, and travels in the direction of the arrow to flow split region 99. In region 99, internal channels cause the flow of cooling fluid to be directed to the electrode of the upper arm of gun 72, while the other portion of the feed path is fed to a first one of two channels of ribbon hose 95. As the cooling fluid circulates around the electrode 96 of the upper arm, it is deflected and returned to split region 99, where it is directed to the second one of the two channels of ribbon hose 95. At region 99', the feed cooling fluid carried in the first one of the channels of ribbon hose 95 is directed to the electrode 96 of the lower welding gun arm, while the cooling fluid carried in the second channel of ribbon hose 95 is directed towards return port 100. The cooling fluid circulating around the lower electrode 96 is deflected and returned to return port 100, where it is joined with the cooling fluid that cooled the electrode of the upper arm of gun 72.

Referring to FIG. 6G, gun 72 includes two ports in region 99, where hose 95 is attached. Thus, the above-referenced first channel of hose 95 may be connected to a feed port in gun 72, while the second channel of hose 95 is coupled to the return port of region 99 on gun 72 (carrying cooling fluid warmed by the electrode 96 associated with the upper arm of gun 72). In similar fashion, gun 72 also includes a similar two ports formed in region 99I having an identical function.

Figures 6B, 6C:
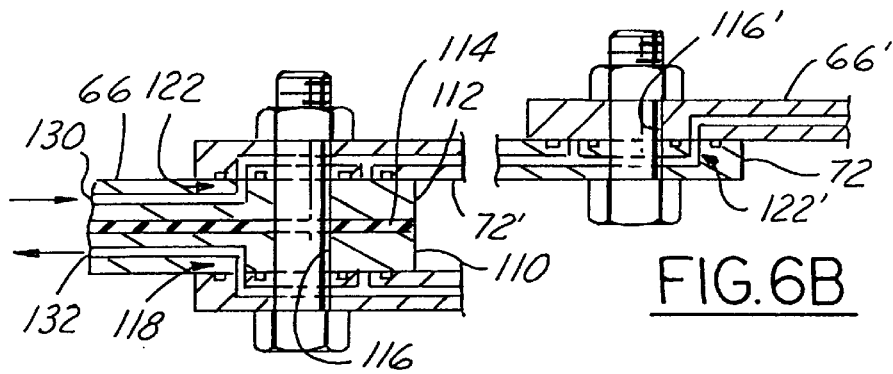
FIG. 6B is a simplified cross-sectional view illustrating how a jumper cable mates with a welding gun without the use of any external cooling fluid fittings or hoses.
FIG. 6C is a simplified cross-sectional view illustrating how a two-way fluid flow kickless cable mates with a fixed portion of a welding gun without the use of external cooling fluid fittings or hoses.
Figure 6D:
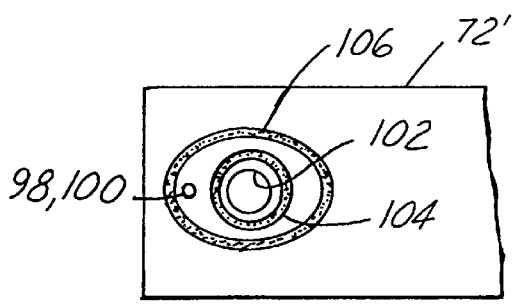
FIG. 6D is a simplified side view of a welding gun illustrating particularly an o-ring structure.
Figure 6E:
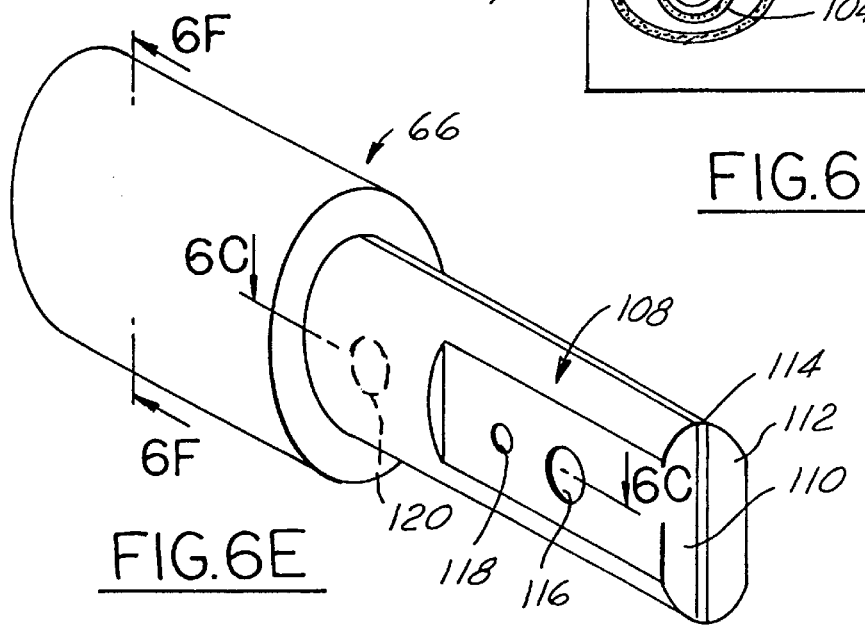
FIG. 6E is a simplified, exaggerated perspective view of the two-way flow kickless cable shown in section in FIG. 6C.
Figure 6F:
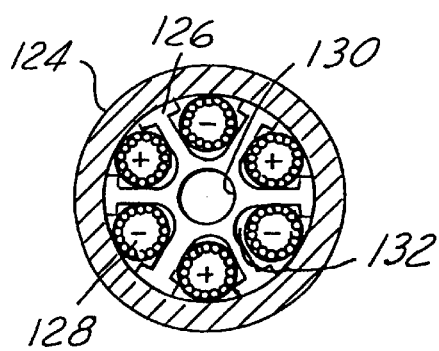
FIG. 6F is a simplified cross-sectional view, not to scale, taken along line 6F—6F of FIG. 6E illustrating feed and return paths for eliminating return hoses.
Figure 6H:
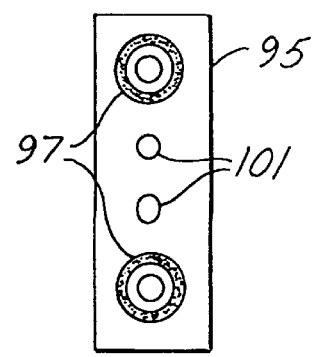
FIG. 6H is an enlarged view of a portion of a fluid connecting ribbon, illustrating two fluid channels.

Referring now to FIG. 6H, a detail of hose 95 is shown, not to scale, illustrating the connections made to the feed and return ports in FIG. 6G. Holes 101 may be used for fastening hose 95 to gun 72. O-rings 97 are used to provide a liquid-tight seal around the feed and return ports in region 99 of gun 72 as shown in FIG. 6G. It should be appreciated that jumper cables are used to carry the current to the upper and lower arms of gun 72 and are preferably coupled to gun 72 in the areas around ports 98 and 100. The jumper cable is mounted to gun 72 by four screws (not shown), and a one-way cooling passage associated with the jumper cable, located in the cable end connector, is adapted to be in registry with inlet/outlet 98/100.

Referring now to FIGS. 6C and 6B, cable 66/gun 72 connections are illustrated. It should be noted at this point that three distinct embodiments may be provided. In the first embodiment, a "hip" mounted transformer embodiment, the transformer 64 is mounted on the hip of the robot, wherein a two-way kickless cable 66 is used to couple the secondary current from the secondary side of the transformer 64 to a fixed portion of welding gun 72. In this configuration, jumper cables are acquired for both the positive and negative polarity leads; accordingly, two jumper cables 66', as shown in FIG. 6B, are required to take the power and cooling fluid from the fixed portion of gun 72 to the movable arm portions of gun 72, as shown best in FIG. 6A (i.e., feed port 98 and return port 100). Thus, in a "hip" mounted configuration, the constructs shown in FIGS. 6C and 6B (i.e., kickless and jumper cables) would exist. However, in a "transgun" embodiment and a remote transformer to a fixed welding gun ("hard tool"), a respective jumper cable 66' is taken directly from a respective terminal on the secondary side of weld transformer 64 to a respective movable arm portion of gun 72. Accordingly, in the "transgun" and "hard tool" embodiments, only jumper cable 66' (and the configuration shown in FIG. 6B) will be needed.

Referring now to FIGS. 6B and 6D, the preferably contemplated structure for a jumper cable 66' connection will be described.

Referring now to FIGS. 6B, and 6D, gun 72 uses a through bolt hole 102 to secure jumper cable to the welding gun 72 (as opposed to four screws, with inlet/outlet in registry with cable channel embodiment). O-rings 104, and 106, respectively surround the through bolt hole 102, and respective eccentrically positioned inlet or outlet 98, 100, as best shown in FIG. 6D. It should be appreciated that in such a configuration, a corresponding jumper cable, of opposite plurality, is provided on gun 72 for carrying the opposite cooling fluid flow.

Referring now to FIG. 6E, cable 66 is shown in a exaggerated, perspective view. Cable 66 is used when workcell 40 uses a "hip" mounted weld transformer 64 (i.e., transformer 64 mounted on the robot body, not on the robot wrist near the weld gun). Cable 66 is used to internally carry both feed cooling fluid, and return cooling fluid from transformer-to-gun-to-transformer. Cable 66 includes end of cable 108, first polarity conductor 110 second polarity connector 112, insulator 114 between conductor 110, and 112, bolt through hole 116, and return port 118. The conventional prior art cable carries fluid in only one direction (i.e., from transformer to weld gun) and includes, a threaded feed port 120 (there is also another feed port 120—not shown—similarly positioned on conductor 112). In the prior art, the cable is inserted into the welding gun and secured thereto by way of through bolt through hole 116. A fitting (e.g., a manifold) would be mated to feed port 120 and used to feed the cooling inlets on the welding gun. The outlets (returns) on the welding gun would be collected in a similar manifold and returned by separate cooling hoses to the plant-provided return cooling water manifold.

In the constructed embodiment, cable 66 includes a second port formed in a position similar to port 120, but formed in conductor 112. The internal structure of cable 66 permits two-way fluid flow. The port 120 in conductor 110 is used as a return port, while the corresponding port 120 in conductor 112 (not shown) is used as a feed port. Thus, in the constructed embodiment, the feed and return manifolds are affixed as small fittings on cable end 108, thus requiring only small jumper hoses from the welding gun inlets and outlets back to these respective return and feed manifolds.

It is preferably contemplated, however, that cable 66 include return port 118 in conductor 110, and a corresponding port 122 in conductor 112, as best shown in section in FIG. 6C. The sealing structure for this configuration is identical to that shown in FIG. 6D, with a first O-ring encircling the through bolt, with a second o-ring encircling both the through bolt and the return or feed ports 118, 122.

FIG. 6F shows the internal cross-section construction of cable 66, which includes a sheath 124, a spider/spacer 126, conductors 128, an inlet feeder path 130, and a return path 132. It should be apparent that conductors of opposite polarity are placed adjacent to each other to avoid reactions during high current carrying intervals.

Preferably, (two-way) cable 66 is obtained from Flex-Cable Company, Morley, Mich. As shown in FIG. 3, Means 53 for securing a workpiece is provided for fixing the workpiece for industrial operations thereon. Clamp arms drawn in solid line indicate an open position, while clamp arms shown in dashed-line indicate closed or clamped position. Means 53 is sometimes referred to as a "tool," and include a base adapted to receive workpiece 56, and clamps 54. Electrically-actuated electronically-controlled clamp 54 is an important component of workcell 40. Clamp 54, as best shown in FIG. 3, is attached to a base portion of securing means 53, and is responsive to a control signal from PIP 46 for actuating each of the clamps 54 to fix the position of the workpiece 56 relative to the base portion of the securing means 53.

Referring now to FIG. 7A, clamp 54 includes push-type solenoid assembly 134, and clamp assembly 136.

Solenoid assembly 134 is responsive to electrical control signals and power signals for converting the electrical energy into linear motion. Solenoid assembly 134 is preferably a commercially available push-type, no pole DC solenoid, model no. S500-A3, by Trombetta Corp., Milwaukee, Wis. Solenoid assembly 134 includes longitudinal axis 138, casing 140, coils 142, plunger 144, reduced diameter bore portion 145 of plunger 144, stator plate 146, enlarged through-bore portion 147 of plunger 144, return or retract spring 148, connecting rod 150, lock washer 152, and locking nuts 154.

Plunger 144 is slidably received in a central portion of casing 140 and is adapted for motion substantially along longitudinal axis 138. Plunger 144 may move from a first position corresponding to a de-energized state of solenoid 134, to a second position corresponding to an energized state of solenoid assembly 134. FIG. 7A shows plunger 144 in the second position. In the first position, plunger 144 is displaced relatively leftwardly of that shown in FIG. 7A along axis 138. Spring 148 is disposed within an enlarged portion 147 of plunger 144. Spring 148 is in compression in both the first position, and the second position of plunger 144. Spring 148 may have an associated free length of six inches, while the enlarged diameter bore portion 147 may have a length of three inches. Thus, when solenoid assembly 134 is in a de-energized state, the force of spring 148 urges plunger 144 to the first position.

Connecting rod 150 is preferably constructed of non-magnetic material, preferably non-magnetic stainless steel. Rod 150 is fastened to plunger 144 by way of threads in reduced diameter bore portion 145. Rod 150 is further fastened to plunger 144 by way of washer 152, and nuts 154. Since plunger 144 is connected to rod 150, travel of plunger 144 to the first position is limited by the permissible travel of rod 150, which is defined more clearly below in the discussion of clamp assembly 136. Likewise, travel of plunger 144 to the second position is also limited by the permissible travel of connecting rod 150, which is more clearly described below.

In the de-energized state of solenoid assembly 134, plunger 144 is positioned leftwardly relative to the position shown in FIG. 7A, due primarily to the force applied by spring 148 to plunger 144, as limited by the permissible travel of connecting rod 150.

In an energized state, plunger 144 moves rightwardly of the de-energized position along axis 138 in the direction of stator plate 146 to reach the second position. Movement to the second position causes further compression of spring 148. Travel to the second position is limited by the permissible travel of connecting rod 150.

Upon de-energization, spring 148 expands, thus causing plunger 144 to return to the first position moving rod 150 leftwardly along axis 138.

Clamp assembly 136 includes first axis 155, housing 156, through-bore 157 (FIG. 7E) formed about axis 155 cover plate 158, fastener 159 (best shown in FIG. 7C), clevis 160, T-channel or raceway 161 (best shown in FIG. 7C), link 162, first pin 164, shaft 166, extending portion 167 of shaft 166 (best shown in FIG. 7D), second pin 168, outer periphery 169 of shaft 166, stop block 170 slot 171 of shaft 166, contact bracket 172, clamp arm 174 (shown in phantom), wear plate 176, a pair of slide racks 178 (best shown in FIG. 7C), fasteners 179 (best shown in FIG. 7C), face plate 180, a pair of proximity switches 182, and bearings 184.

Housing 156, as shown in FIGS. 7A–7E, provides a general base structure for operation of clamp 54. As best shown in FIG. 7E, housing 156 includes a through bore 157 sized to accommodate shaft 166 therein, as shown in FIG. 7D.

Cover plate 158 is fastened to housing 156 by way of conventional fasteners, as best shown in FIG. 7C. Cover plate 158 excludes contaminants from entering the interior portion of clamp 54 from the top. As shown in FIG. 7C, T-shaped wear plate 176 is fastened to cover plate 158 by way of fastener 159. Thus, wear plate 176 is fixed relative to housing 156.

Clevis 160, as best shown in FIGS. 7C and 7D, includes a correspondingly shaped T-shaped raceway 161 formed on a top portion thereof, raceway 161 being defined partially by a pair of slide racks 178 fastened to clevis 160 by way of fasteners 179. Clevis 160 is slidably disposed on wear plate 176 for motion in either direction along axis 138. In one embodiment, wear plate 176 and raceway 161 form the means for slidably mounting clevis 160 for motion relative to housing 156 along axis 138. Connecting rod 150 threadedly engages clevis 160. Thus, plunger 144 moves in unison with clevis 160 along axis 138 by way of connecting rod 150. Accordingly, clevis 160 also assumes the first position (de-energized state of solenoid assembly 134), and the second position (corresponding to an energized state of solenoid assembly 134). Clevis 160 is shown in the second position in FIG. 7A.

Link 162 is rotatably connected to clevis 160 by way of pin 164. Link 162 is shown in a first position (in phantom-FIG. 7A) corresponding to a deenergized state of solenoid assembly 134. Link 162 is shown in solid line in FIG. 7A corresponding to an energized state of solenoid assembly 134.

As best shown in FIG. 7D, shaft 166 is disposed within bore 157 of housing 156, and is adapted for rotation therein about axis 155. Shaft 166 is generally cylindrical in shape, and is coupled to link 162 by way of pin 168. Shaft 166 further includes a portion 167 extending outwardly therefrom, as best shown in FIG. 7B. Portion 167 serves two purposes. First, a surface portion of extension 167 is used, in cooperation with stop block 170, to limit the clockwise rotation of shaft 166 within housing 156, as best shown in FIG. 7A. Secondly, extension 167 provides a means for fastening clamp arm 174 to clamp 54. Shaft 166 also includes a slot 171 extending radially inwardly from outer periphery 169. Clevis 160 is disposed in slot 171 (FIG. 7C).

Stop block 170, in addition to the stop function previously described, also serves to retain and position shaft 166 within housing 156.

Contact bracket 172, best shown in FIGS. 7A, and 7B, is provided for making contact with proximity switches 182. Contact bracket 172 is fastened to shaft 166 for rotation therewith. Accordingly, in the second position (corresponding to the energized state of solenoid assembly 134), contact bracket 172 contacts the lower proximity switch, as viewed in FIG. 7A. This corresponds to a clamped or closed position of clamp 54. When solenoid assembly 134 is de-energized, contact bracket 172 is adapted to contact the upper proximity switch as shown in FIG. 7A, indicating t hat the clamp is in an open or unclamped position. It should be appreciated that proximity switches 182 may take a variety of forms, that are recognized as conventional by those of ordinary skill in the art.

Bearing 84 is preferably a Rulon standard load bearing type DRS-0609-4.

Associated with clamp 54 is a rectifier/driver module (not shown) selected to match the operation of solenoid assembly 134. The rectifier/driver module is commercially available, and preferably is Model Q517-A1, from Trombetta Corporation. The rectifier/driver module receives as an input 120 volts AC. The rectifier/driver output is dual-state: for approximately 0.5 seconds after 120 volts AC is applied to the input, the rectifier/driver module outputs approximately 108 volts DC to the solenoid assembly 134 (connections not shown). This high voltage is required in order to overcome the high inertia involved in moving the plunger from a rest position. After the 0.5 second interval has expired, the rectifier/driver module automatically decreases its output voltage to solenoid assembly 134 to approximately 15 volts DC, a level sufficient to "hold" or maintain solenoid assembly 134 in an energized state.

In the constructed embodiment, each clamp in the proximity of tool 53 has a 6-conductor cable interfaced thereto. The rectifier/driver module associated with each clamp is housed not proximate the clamp itself, but rather, in the PIP 46. The 6 wires leading from each clamp are as follows: (1) a positive (+) DC voltage lead; (2) a negative (−) DC voltage lead; (3) a "hot" power lead that is split at the clamp and provided to each of the 2 proximity switches 182; (4) a ground lead; (5) a lead associated with a first one of the switches 182; (6) a lead associated with the other one of the switches 182. These 6 leads are taken from clamp 54 to the PIP 46.

The first 2 leads (DC power for solenoid assembly 134), are wired to the outputs of a respective rectifier/driver module. Leads (3) and (4) are connected to power. Leads (5) and (6) are connected to various I/O points. The PLC or PC (hereinafter to mean computer 42 with PLC replacement software) is operative to apply, in accordance with a preprogrammed control strategy, 120 volts to the input of the rectifier/driver. The other 2 leads from the proximity switches are cross connected in the PIP 46 to the appropriate I/O ports for use by the control program of the PLC or PC.

It is preferably contemplated, however, that clamps 54 be connected in a multiplexed, daisy-chain type arrangement. In particular, intelligent I/O modules are known in the art for implementing such a multiplexing scheme. For example, one such device, commercially available, is a serial multiplexer module (SPX series) by APC Seriplex™, Jackson, Miss. In general, the Seriplex module operates as follows. Each module is programmed with an address and a command. A 4-conductor bus (clock, data, and power leads) is then daisy chained to each clamp having a programmed module. When an address is applied to the bus (accomplished by raising the data line during a time slot of the clock corresponding to the desired address), all devices having the selected address perform the preprogrammed command. So, for example, the I/O module associated with clamp 54 may be preprogrammed to close a rely associated therewith (i.e., one of the available commands) operative to apply 120 volts AC to the above-described rectifier/driver module to thereby actuate the associated clamp 54. In this fashion, the wiring requirements are significantly reduced. A bus control (also commercially available, for example, a PC interface card model SPX-PC-INTF from APC Seriplex) need only apply the address of the clamp desired to be actuated to the bus. This procedure can be repeated in rapid succession for each address associated with each clamp to close each clamp associated with tool 53.

Referring now to FIG. 7A, a description of the operation of clamp 54 will now be set forth. In a de-energized state, spring 148 is operative to move plunger 144 to the first position, thereby also moving connecting rod 150 leftwardly, which in turn moves clevis 160 leftwardly, which in turn moves link 162 to the first position, a s indicated in FIG. 7A in phantom line. Since link 162 is pinned to shaft 166, shaft 166 is rotated to a corresponding first position. The clamp arm 174 is thus in an open or unclamped position.

To actuate clamp 54, a control (PLC or PLC replacement system) applies an activate signal to a I/O port in PIP 46. In the constructed embodiment, 120 volts AC is then applied to the rectifier/driver module (not shown). The rectifier/driver module then applies approximately 108 volts DC to the positive and negative leads which are then taken to, over various cabling, to solenoid assembly 134 of clamp 54. As coils 142 are energized, plunger 144 moves relatively rightwardly along axis 138, thus further compressing spring 148. Connecting rod moves with plunger 144 thus causing clevis 160 to move away from the first position linearly along axis 138. Clevis 160 is guided in its travel by way of the T-shaped keyway 161, and corresponding T-shaped wear plate 176. Since link 162 is rotatably pinned by pin 164, and is further pinned to shaft 166 by way of pin 168, linear motion of clevis 160 is translated to rotational movement of shaft 166. Shaft 166 continues to rotate clockwise (as viewed in FIG. 7A) until portion 167 of shaft 166 abuts stop 170. Clevis 160, and plunger 144 are now in the second position wherein the workpiece is clamped, as shown by dashed-line clamp arms in FIG. 3. After approximately 0.5 seconds, the rectifier/driver module down grades the applied voltage to approximately 15 volts DC to "hold" the plunger 144 in the second position.

To open the clamp, the solenoid assembly 134 must be de-energized. This is achieved under control of the PLC or PLC replacement system, which discontinues input power to the rectifier/driver module. The rectifier/driver module, in turn, discontinues energizing power to solenoid assembly 134. Plunger 144 begins to move from the second position to the first position under the force applied by spring 148. As plunger 144 retracts, so does connecting rod 150, and clevis 160. As clevis 160 moves leftwardly, relative to the position shown in FIG. 7A, link 162 also moves from the position shown in solid line to the position shown in phantom line in FIG. 7A. Shaft 166 is accordingly rotated counterclockwise, and the clamp is therefore opened.

An important feature of clamp 54 relates to link 162. In a clamped (second) position, forces applied to clamp arm tending to open clamp 54 are directed generally upwardly, as indicated by the arrow labelled Force. The force is generally perpendicular to the direction of travel of clevis 160, rod 150, and plunger 144. Therefore, once activated, clamp 54 is mechanically locked—and therefore able to withstand forces (opening) generally greater than the force developed by solenoid assembly 134. This feature permits use of a smaller solenoid than would otherwise be required if the solenoid had to develop sufficient force to directly counteract any unclamping/opening forces.

As indicated above, it is preferably contemplated that the clamps be bus multiplexed by way of conventional "smart chip", to enable a reduction in wiring. In this embodiment, the method of securing a workpiece 56 by selectively actuating one of a plurality of the electrically-clamps 54 through the resulting data highway includes the following steps. First, each clamp is assigned an address on the bus. Some systems require that this address be unique. Other systems, such as the Seriplex methology, permit the same address to be used by more than one device. The next step involves selecting one of the clamps for actuating. Next, the control signal on the bus must be formatted to include the address associated with the clamp selected in the prior step. In the APC Seriplex system, the formatting step preferably takes the form of raising the data lead on the bus to a logic high level during a time slot of the clock corresponding to the desired or selected address. The next step involves broadcasting the control signal to each clamp through the data highway or bus. Finally, providing actuation power to the addressed clamp. The APC Seriplex system performs this step by closing a rely, which may be externally configured to supply the necessary power to the clamp rectifier/driver module.

Figure 8:
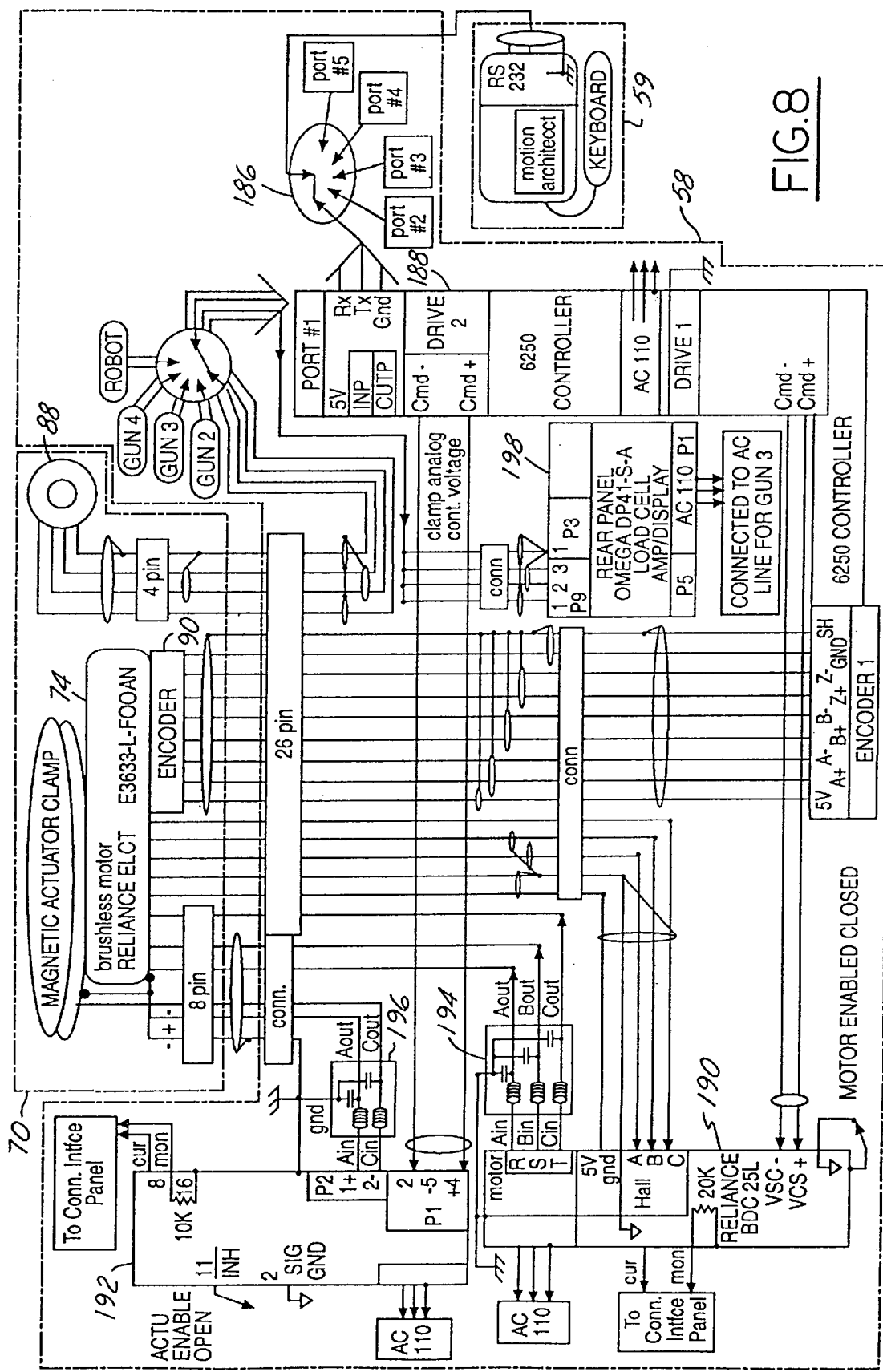
FIG. 8 is a simplified schematic and block diagram view of the control circuit used to control the electronically-controlled electrically-actuated device depicted in FIG. 5.

Referring now to FIG. 8, actuator control 58 includes selector switch 186, 2-axis servo controller 188, brushless amplifier 190, DC brush type servo amplifier 192, terminal blocks 194, 196, and load cell display 198.

Actuator control input device 59 may be used with a plurality of controllers 188; accordingly, selector switch 186 is provided for implementing the flexibility necessary for such a configuration.

Controller 188 of control 58 is provided for controlling the DC motor 74, and actuator clamp 76 portions of actuator positioning and clamping device 70. Controller 188 is conventional and commercially available, and may be, for example, model 6250 from Parker Hannifin Corporation (Compumotor), Rohnert Park, Calif. The controller 188 is a sophisticated device which may be programmed to control both the position of sleeve member 92 (see FIG. 5) by way of encoder 90 data, and thus the jaw opening (i.e., tip separation distance) of welding gun 72, and further, to control the clamping force applied by welding gun 72 using load cell 88 feedback data. These programs may take the form of "schedules" that are designed and tuned on input 59, and downloaded into controller 188 for run-time retrieval and execution. Amplifier 190 is conventional and commercially available, and may be a Reliance model BDC25L, available from Electro-Craft®, Edan Prarie, Minn. Amplifier 190 is a brushless amplifier and is responsive to the command signals generated by controller 188 in accordance with its program in order to provide drive signals to motor 74 by way of terminal block 194.

Amplifier 192 is also conventional and commercially available, and may be model series 30A-AC model 16A20-AC, available from Advanced Motion Controls, Camarillo, Calif. Brush type servo amp 192 is responsive to a clamp analogue command voltage control signal generated by controller 188 in accordance with its program for generating corresponding drive signals by way of terminal block 196 to magnetic actuator clamp 76.

Actuator control input 59 is provided for programming controller 188 in accordance with a predetermined control strategy. For example, and as indicated above, actuator device 70 may be programmed to maintain a predetermined separation distance between the electrodes 96 of welding gun 72 when robot 50 moves assembly 52 from weld 1 position to weld 2 position, the separation distance being selected just to avoid any obstruction. Further, controller 188 may be programmed to cause welding gun 72 to clamp to a predetermined force, as detected by load cell 88. Moreover, kinematics related to the closing, clamping, and opening of welding gun 72 may be controlled on a force-vs-time basis (a so-called "profile"). A software program may be used to initialize and program the schedules into controller 188 and preferably, in the input mechanism is a software program named Motion Architect™, version 3.1, available from Parker Hannifin.

Weld control 60 is provided for controlling timing, duration, percent heat, percent current, current, and many other factors that are well known to those of ordinary skill in the art that are related particularly to the weld event itself. Weld control 60 accomplishes this end by selectively connecting a power source (e.g., 440 volts) across the primary side of transformer 64. The transformer 64 converts this relatively high voltage, low-current, into a very high current low voltage across the secondary side of transformer 64. When the power source is applied to transformer 64, relative to the power source voltage, affects the character of the weld. Weld control 60, also known as a weld timer 60, are conventional units and are commercially available, and may be model number 700-S, part number 970-0161 (for the robot 50 weld gun), and part number 970-0162 (for the fixed weld gun "hard tool" associated with the clamping tool 53), available from Medar, Farmington Hills, Mich. In the preferred embodiment, the weld controls are purchased so as to comply with Chrysler welding spec WC 2.1. Further, the hard gun weld control (not illustrated) is a 300 amp, 50% duty cycle air cooled SCR configuration. The primary power electronics in weld control 60 are power switching devices (known as a contactor structure), generally selected to be silicon-controlled rectifiers (SCRs). For the weld control 60 shown, the SCR's selected may be identified as part number PAAA7T100718BT, available from Darrah. In accordance with the present invention, no cooling water is used to cool these power electronic devices. Rather, they are air cooled through the use of heat sinks. The heat sink used in the preferred embodiment is a Darrah, model A7. The current carrying limit of the SCR's as used in conjunction with the heat sink, is specified at 420 amperes, continuous. This limit has been found to be satisfactory in the preferred embodiment illustrated in FIG. 3.

Transformer 64 is a conventional design, and may be a 200 KVA model number G446200KL2164W, from Roman Manufacturing Incorporated. Transformer 64 includes a first inlet and outlet to define a cooling fluid path. In one embodiment ("hip mount"), cable 66, shown in FIG. 6E is used and short jumper hoses are used to link the transformer cooling water inlet/outlet ports to the feed/return ports 120 of cable 66. It is preferably contemplated that a mounting bracket for transformer 64 like that shown in FIG. 6C and designated as 72 be adapted for use in conjunction with welding transformer 64 such that the aforementioned short jumper hoses can be eliminated. In other words, it is preferably contemplated that transformer 64 be fitted with a bracket of the same design as shown for the gun 72 illustrated in FIG. 6C.

Figure 9A:
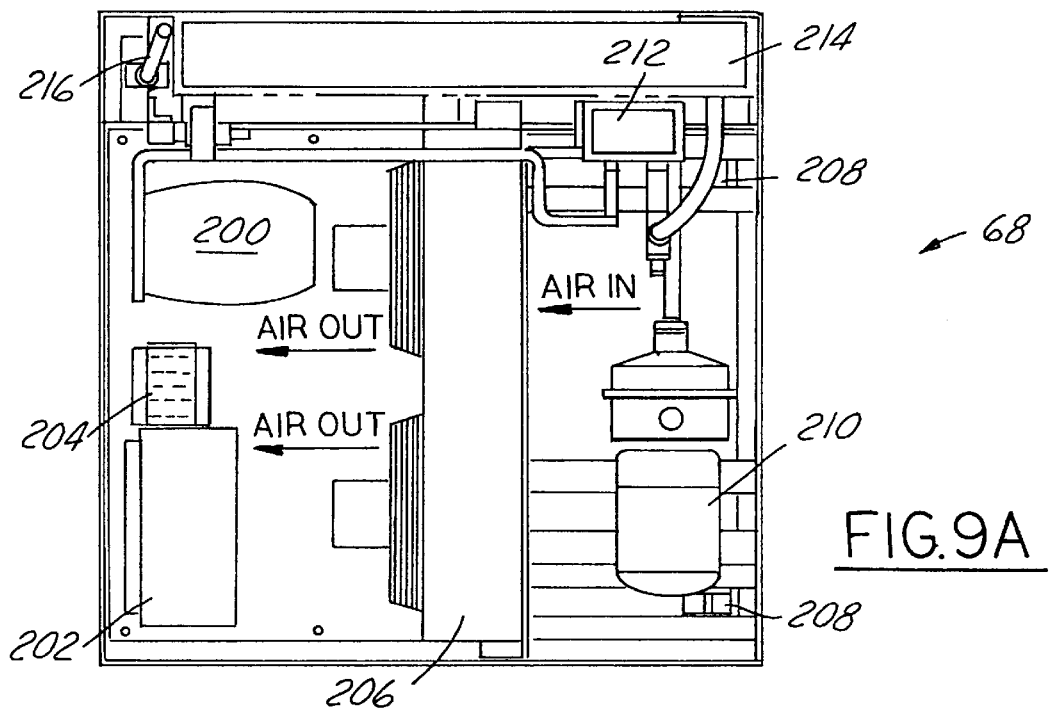
FIGS. 9A, 9B, and 9C is a simplified diagrammatic view illustrating top, left-side, and front views of a chiller referred to in FIG. 4.
Figure 9B:
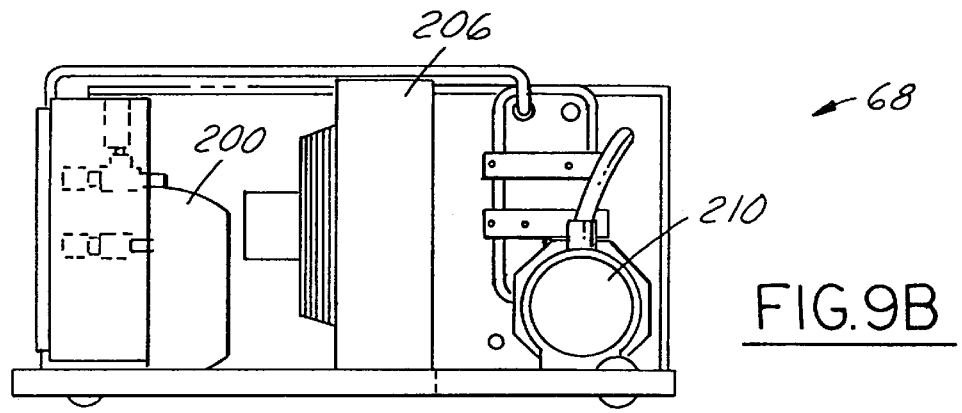
Figure 9C:
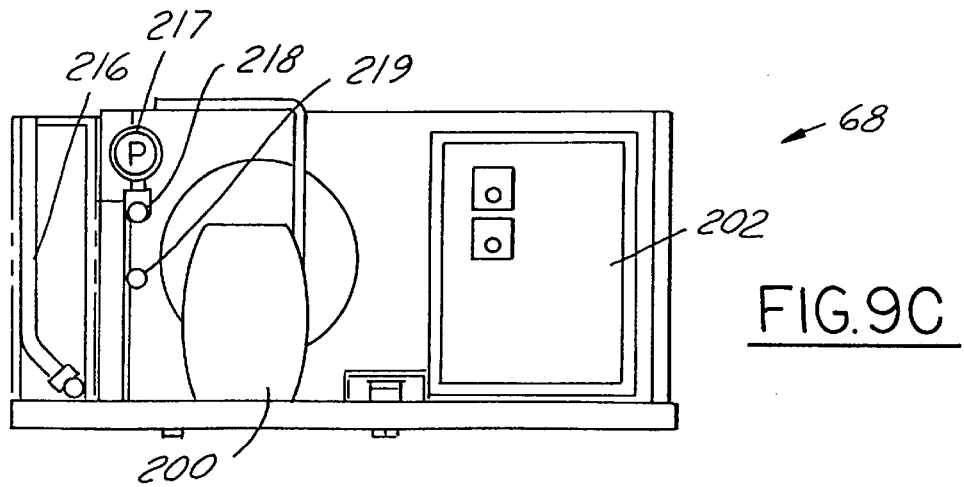

FIGS. 9A, 9B, and 9C shows various views of chiller 68. The main feature of chiller 68 lies not primarily with the function that it performs; this is generally conventional. But rather, in the packaging or compactness of its design, which permits placing the chiller underneath robot 50 and workcell 40. In a preferred embodiment, the chiller is 40" square, and 20½" in height. Approximate weight 480 lbs. The chiller 68 is associated exclusively with workcell 40, thus obviating the need for reliance on plant-provided cooling water, as in prior art workcell 10. The chiller functions to remove heat from the cooling fluid, and provide flow energy to circulate the cooling fluid throughout the workcell 40. Chiller 68 includes compressor 200, electrical box 202, caster 204, air-cooled condenser 206, tread 208, process pump 210, evaporator 212, reservoir 214, sight glass 216, pressure gage 217, a feed port 218 to feed cooling fluid to the robot manifold 69, and a return port 219 for receiving cooling fluid from the robot manifold 69. In the preferred embodiment, the chiller 68 is a model PCAQ-3-NF-460 from Alpha Environmental Refrigeration Company, Rochester Hills, Mich.

In the preferred embodiment, compressor 200 includes a 3 horse power, 1800 RPM, 6.7 amp electric motor. Air-cooled condenser 206 includes an air-cooled condensing unit, part number F3AD-A301-TFD-001 from Copeland. Process pump 210 may be a 2 horse power, 3450 RPM, ODP part number LCAA-2035 from G & L. The process pump is provided for generating a head for circulating the cooling fluid through workcell 40. In the preferred embodiment, a flow rate of 10 gallons per minute (GPM) at 60 psi has been found to be satisfactory.

Evaporated 212 may be a braze plate evaporator, part CH-3A from Flat Plate. Reservoir 214 is preferably a 10 gallon stainless steel reservoir, part number 10SS from Alpha Environmental Refrigeration Company.

Figure 10:
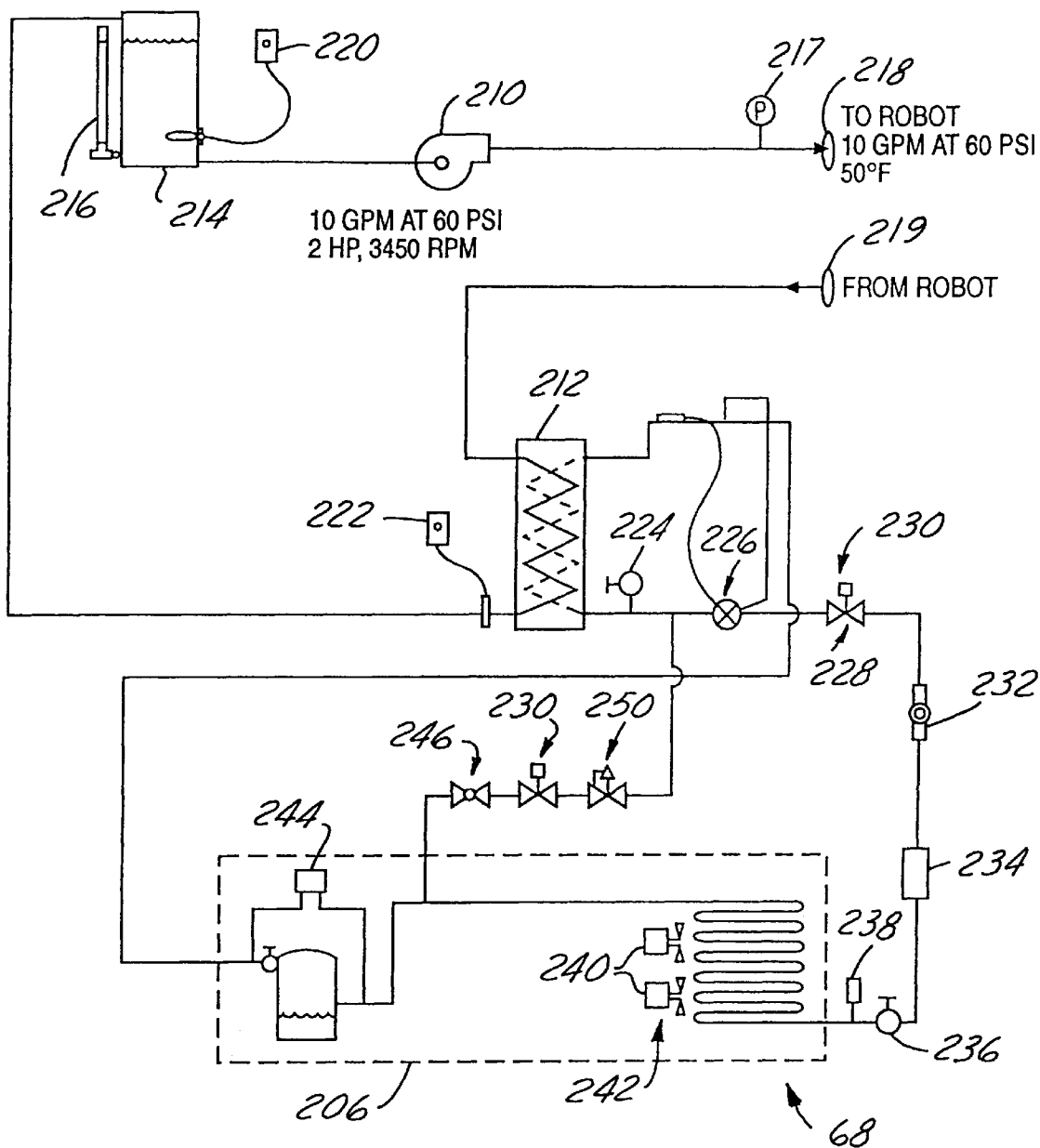
FIG. 10 is a simplified diagrammatic and schematic diagram view of the chiller of FIG. 9.

Referring now to FIG. 10, a functional diagrammatic and schematic diagram view of chiller 68 is depicted. Chiller 68 further includes an over temperature thermostat 220, a freeze thermostat 222, an access valve 224, an expansion valve 226, a liquid line solenoid valve 228, a solenoid coil 230, a liquid line sight glass 232, a filter drier 224, a liquid line valve 236, a pressure relief valve 238, a pair of condenser fan motors 240, condenser fan blades 242, a pressure control 244, a hot gas service valve 246, a hot gas solenoid valve 248, and a hot gas bypass valve 250. The components are conventional and commercially available and operate in a manner known to those skilled in the art.

Referring now to FIG. 4, the closed loop self contained cooling system will be described in total for a "hip mount" embodiment. Chiller 68 provides a continuous supply of cooling water at a feed port. The feed port 218 is routed internal to robot 50 to manifold 69. Manifold 69 includes 2 feed hoses therefrom, and 2 return hoses. One feed hose and one return hose is used solely for weld transformer 64 and are connected to the first inlet and outlet, respectively. The second set of feed/return hoses of manifold 69 are routed to cable 66 proximate transformer 64. Cable 66 includes internal feed and return paths. In the constructed embodiment, cable 66 mounts to transformer 64 electrically, while ports 120 (feed and return), as described above, receive the feed and return hoses from manifold 69, respectively. At the far end at gun 72, cable 66 terminates on a fixed portion of gun 72, and ports 120 (feed and return) of cable 66 are fitted with manifolds to feed gun 72, as described above.

It is preferably contemplated, however, that the advanced sealing technology described be used.

As best illustrated in FIGS. 6B and 6C, portion 72 shown in FIG. 6C represents the fixed portion of gun 72 (using the internal channels 118, 122) in the preferred embodiment shown in FIG. 3. Jumper cable 66 then takes the cooling fluid to the movable arm portion of gun 72.

Referring now to FIG. 6A, the jumper cable is fastened to the movable part of gun 72 at inlet 98. Fluid flow feed cooling water is then split internally in gun 72. A first portion of the cooling water is directed through a first channel of ribbon hose 95 from the upper arm to the lower arm and further then directed to the lower arm electrode and then deflected back to outlet 100. The second portion of the split feed cooling water is directed to the electrode 96 of the upper arm, deflected, and then fed through a second channel in ribbon hose 95 to the lower arm of gun 72, and is further directed internally to outlet 100 to be joined with the first portion of the feed cooling water. The combined outlet stream from outlet 100 defines the return cooling water. Return cooling water from outlet 100 is then channeled, by a Jumper 66', back to the fixed portion of gun 72, where it is then directed to the return path in cable 66 (as shown in FIG. 6C), and thence back to the return feed hose at the end of cable 66 proximate weld transformer 64, as shown best in FIG. 4. The return cooling water is then transported into manifold 69 and returned to chiller 68. It is preferably contemplated that the four hoses of manifold 69 be reduced to one feed hose/one return hose as follows. Feed hose to transformer 64 inlet. Transformer 64 splits feed: one portion to cable 66 connected to transformer 64 by structure of FIG. 6C; a second portion to cool transformer 64 itself. Return fluid from gun 72/cable 66 is joined with second internally to transformer 64 to form one return feed to manifold 69. It should be appreciated that the host of cooling water feed and return hoses, manifolds, etc. have been eliminated by a workcell in accordance with the present invention, as shown generally in FIGS. 3 and 4.

Figure 11:
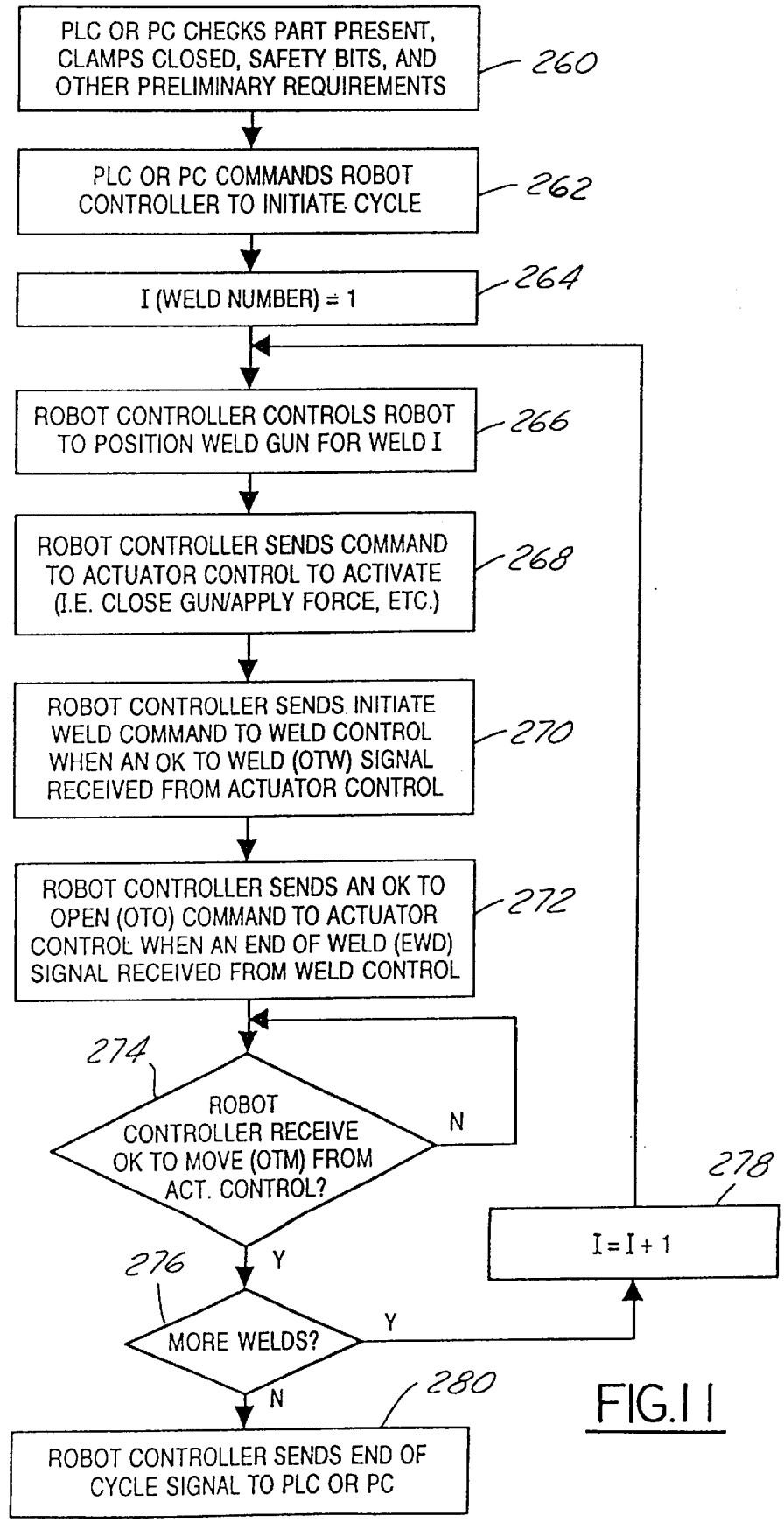
FIG. 11 is a flow-chart diagram view indicating the steps performed during the operation of the preferred resistance welding workcell embodiment of FIG. 3.

Referring now to FIG. 11, the steps performed by the preferred embodiment of the present invention will now be described. In step 260, the PLC or PLC replacement system (PC 42 with PLC replacement software) first determines whether several preliminary requirements have been met. These preliminary requirements include checking whether a part present signal is active, whether all of the clamps 54, as commanded, have closed, as indicated by respective proximity switches 182 and whether a plurality of other initialization requirements (e.g. safety screen unbroken, etc.) have been met.

In step 262, the PLC or PLC replacement commands robot controller 48 to initiate a cycle. A "cycle" is a series of welds that may be required for a particular workpiece(s) under process.

In step 264, the weld number, represented by the variable I, is set to 1.

In step 266, the robot controller controls robot 50 to position weld gun 72 for weld I. It should be appreciated to those skilled in the art, that the position for each one of the I welds has been preprogrammed into robot controller 48 by way of robot controller input 49. Robot controller 48 will not proceed with execution until robot 50 has moved to a position corresponding to weld I.

In step 268, robot controller 48 sends a command to actuator control 58 to activate actuator assembly 70. The term "activate" means to control device 70 such that welding gun 72 closes and applies a predetermined, programmed clamping force associated with weld I.

In step 270, robot controller 48 sends an initiate weld command to weld control 60 when an okay to weld (OTW) signal is received from actuator control 58. Actuator control 58 sends out an okay to weld signal when it has completed its preprogrammed closure of welding gun 72, and has applied the predetermined force.

In step 272, robot controller 48 sends an okay to open (OTO) command to the actuator control 58 when an end of weld (EWD) signal is received from weld control 60. Weld control 60 sends the end of weld signal when it has completed the programmed weld schedule for weld I. It should be appreciated that a conventional weld control, such as weld control 60 may be programmed with a variety of so-called weld schedules, each schedule defining a unique weld event (percent heat, number of amperes, number of cycles, etc.). It should be further appreciated that in step 270, part of the initiate weld command includes selection of a particular weld schedule, which is selected in advance when robot controller 48 is being programmed. Thus, a "cycle" includes not only weld gun position information for each one of the I number of welds, but also weld schedule information associated with each one of the I number of welds, but also an actuator schedule defining a separation distance of electrodes 96 prior to welding, a force-vs-time profile for the closure of gun 72, the clamping force, and a mid separation distance, optimized to decrease the amount of time needed to clamp down during the next weld (while avoiding obstructions).

In step 274, robot controller 48 waits to receive an okay to move (OTM) signal from the actuator control which occurs when the actuator control 58 has caused actuator assembly 70 to move the jaws of welding gun 72 to a predetermined mid separation distance in order to clear any obstruction to get to the next weld position.

In step 276, robot controller 48 checks to see whether there are any remaining welds to be accomplished in the current cycle. If there are more welds, execution occurs through step 278, wherein the weld counter is incremented by one, and execution resumes again at step 266–276 for the next weld position. However, if all the welds have been made, then robot controller 48 sends an end of cycle signal to the PLC, or PLC replacement system (PC 42 plus PLC replacement software).

Figure 12:
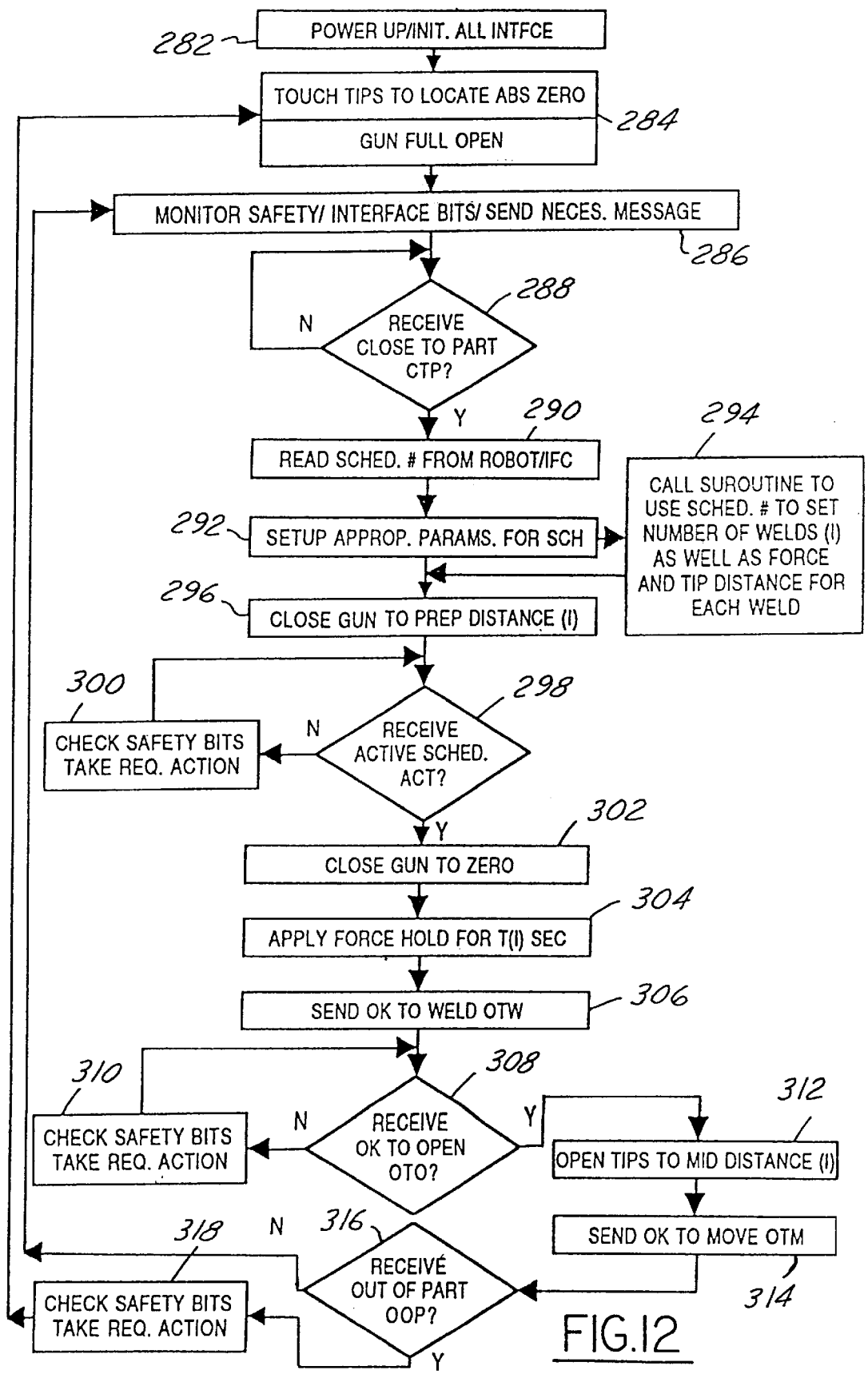
FIG. 12 is a simplified flow-chart diagram view of the steps performed by the actuator control circuit shown in FIG. 8 during the operation of the resistance welding workcell embodiment of the present invention.

Referring now to FIG. 12, the internal operation of actuator control 58, in conjunction with actuator assembly 70, and welding gun 72 will now described. In step 282, general initialization procedures are performed.

In step 284, control 58 causes the electrodes 96 of gun 72 to touch to determine an absolute 0 position, as indicated by encoder 90 shown in FIG. 5. Gun 72 is then fully opened.

In step 286, the status of certain safety and interface bits are monitored and necessary communication with other controls (such as robot controller 48) occur.

In step 288, a test is performed to see whether a close to part has been received, indicating that the workpiece has been clamped into position.

In step 290, a schedule is read from robot controller 48 interface. As indicated above, the schedule contains specified information for each weld, including but not limited to, clamping force, tip distance, for each weld, force-vs-time profile, etc.

In step 292, appropriate parameters corresponding to the received schedule are initialized.

In step 294, subroutines are executed using the schedule number to set the number of welds, as well as the above-mentioned parameters associated with each weld, including clamping force and tip distance.

In step 296, the welding gun 72 is closed to a prep distance associated with the current weld point. This prep distance is predetermined to optimize closure time.

In step 298, a test is performed to determine whether robot controller 48 has sent the activate command. If not, predetermine safety bits are again checked in step 300, and a test is again performed.

In step 302, the gun has closed to 0 when the activate command is received from robot controller 48.

In step 304, the predetermined clamping force is applied and held for a predetermined time associated with the current weld.

In step 306, actuator control 58 sends an OTW signal to robot controller 48.

In step 308, a test is performed to determine whether the OTO signal has been received. At this point, robot controller 48 is commanding weld control 60 to initiate and complete a weld in accordance with a predefined and preselected weld schedule associated with the current weld.

In step 310, predetermined safety bits are again checked in step 310.

In step 312, once the OTO signal has been received by actuator control 58, the tips 96 of gun 72 are open to a mid separation distance associated with the current weld. It should be appreciated that this distance has been selected, based upon the geometry of the workpiece, and the window in which the robot wrist may travel, in order to optimize (i.e. reduce) the time it takes to travel to the next point and close the gun for the next weld.

In step 314 actuator control 58 sends an okay to move (OTM) signal to robot controller 48.

In step 316, actuator control 58 checks to determine whether it has received an out of part (OOP) signal, indicating that the workpiece or part has been completely processed, and is being moved to another workcell.

In step 318, again, certain safety bits are monitored and checked and any required action is taken.

In view of the foregoing, the advantages of a workcell in accordance with the present invention should be apparent. Eliminating all of the compressed air hoses, and substantially eliminating all of the loose cooling water hoses, by eliminating reliance upon plant-provided facilities, contributes significantly to improve reliability and up time. Further, by eliminating the above-mentioned hoses, workcell variability (i.e. workcell-to-workcell) is significantly reduced, thus making the job of programming the various controls, especially movements of robot 50, significantly easier, and therefore more cost effective. In this connection, elimination of the above-mentioned hoses also provides larger windows for which the robot arm may pass, thus further easing the task of programming the movement of robot 50. Material cost is further significantly reduced, in shear terms, by eliminating various pipes, hoses, manifolds, dense packs, etc. Further, the labor involved to install the above-mentioned components has accordingly also been eliminated. Not only is cost reduced, and maintainability and up time increased, but performance of a workcell in accordance with the present invention is also significantly improved. Particularly, actuator control 58, actuator assembly 70 and welding gun 72 cooperate to provide a virtually infinite variety of tip separation distances, and clamping forces. This flexibility permits not only improved processing speed (i.e., the time required to make a weld, move on to the next weld, and complete processing of the workpiece), but further, also provides the necessary control, by way of accurately providing clamping force, to more closely control the welding event, thus improving the quality of welds, and perhaps, reducing the number of welds required to be made on a particular workpiece.

The preceding description is exemplary rather than limiting in nature. A preferred embodiment of this invention has been disclosed to enable one skilled in the art to practice this invention. Variations and modifications are possible without departing from the purview and spirit of this invention; the scope of which is limited only by the appended claims.

We claim:

1. An improved resistance welding system having self-contained, closed loop cooling, comprising:

a chiller associated exclusively with said welding system for removing heat from cooling fluid, said chiller having a feed port and a return port for said fluid;

a welding transformer having a first inlet and outlet to define a first cooling path, said first inlet being coupled to said feed port, said first outlet being coupled to said return port of said chiller;

a cable connected to a secondary side of said transformer at a first end for carrying secondary welding current, said cable including means coupled to said chiller for internally bidirectionally transferring cooling fluid; and a welding gun connected to a second end of said cable and having a pair of electrodes for applying said secondary welding current through a pair of workpieces, said welding gun including means for receiving, circulating, and returning cooling fluid to said chiller.

2. The system of claim 1 wherein said welding gun includes a plurality of internal channels for cooling said electrodes which derive from a common inlet and rejoin at a common outlet.

3. The system of claim 1 wherein said transformer includes a primary side that is selectively connected through an air-cooled contactor structure to a power source.

4. The system of claim 1 wherein said means for receiving, circulating, and returning cooling fluid is internal to said welding gun.

* * * * *

UNITED STATES PATENT AND TRADEMARK OFFICE
CERTIFICATE OF CORRECTION

PATENT NO. : 6,066,824
DATED : May 23, 2000
INVENTOR(S) : Michael D. Crawford, Joseph L. Miller and Milton L. Turner It is certified that error appears in the above-identified patent and that said Letters Patent is hereby corrected as shown below:

Title page,
Item [62], insert the following:
-- Related U.S. Application Data
[62] Division of application No. 08/424,933, filed on Apr. 19, 1995, now Pat. No. 5,742,022. --

Column 1,
Line 4, before "BACKGROUND OF THE INVENTION" insert:
-- RELATED APPLICATIONS
This application is a division of prior U.S. patent application Ser. No. 08/424,933, filed Apr. 19, 1995, now U.S. Pat. No. 5,742,022. --

Signed and Sealed this

Fourteenth Day of June, 2005

JON W. DUDAS
*Director of the United States Patent and Trademark Office*